(12) United States Patent
Arbuckle et al.

(10) Patent No.: US 10,429,845 B2
(45) Date of Patent: Oct. 1, 2019

(54) SYSTEM AND METHOD FOR CONTROLLING A POSITION OF A MARINE VESSEL NEAR AN OBJECT

(71) Applicant: Brunswick Corporation, Mettawa, IL (US)

(72) Inventors: Jason S. Arbuckle, Horicon, WI (US); Steven J. Andrasko, Oshkosh, WI (US); Andrew J. Przybyl, Berlin, WI (US)

(73) Assignee: Brunswick Corporation, Mettawa, IL (US)

( * ) Notice: Subject to any disclaimer, the term of this patent is extended or adjusted under 35 U.S.C. 154(b) by 0 days.

(21) Appl. No.: 15/818,233

(22) Filed: Nov. 20, 2017

(65) Prior Publication Data

US 2019/0155288 A1 May 23, 2019

(51) Int. Cl.
*G05D 1/02* (2006.01)
*B63J 99/00* (2009.01)
(Continued)

(52) U.S. Cl.
CPC .......... *G05D 1/0206* (2013.01); *B63H 21/21* (2013.01); *B63J 99/00* (2013.01); *B63H 2025/026* (2013.01); *B63J 2099/008* (2013.01)

(58) Field of Classification Search
CPC ...... G05D 1/0206; B63H 21/21; B63H 25/04; B63C 1/04
(Continued)

(56) References Cited

U.S. PATENT DOCUMENTS 2,585,502 A 2/1952 Schneider
2,775,328 A 12/1956 Yokel
(Continued)

FOREIGN PATENT DOCUMENTS

DE 906907 3/1954
EP 0423901 A1 4/1991
(Continued)

OTHER PUBLICATIONS

English Translation: Tomita, JP H06286694 A, Oct. 1994, Japanese Patent Office Publicaiton (Year: 1994).*
(Continued)

*Primary Examiner* — Nadeem Odeh
(74) *Attorney, Agent, or Firm* — Andrus Intellectual Property Law, LLP

(57) ABSTRACT

A marine vessel is powered by a marine propulsion system and movable with respect to first, second, and third axes that are perpendicular to one another and define at least six degrees of freedom of potential vessel movement. A method for controlling a position of the marine vessel near a target location includes measuring a present location of the marine vessel, and based on the vessel's present location, determining if the marine vessel is within a predetermined range of the target location. The method includes determining marine vessel movements that are required to translate the marine vessel from the present location to the target location. In response to the marine vessel being within the predetermined range of the target location, the method includes automatically controlling the propulsion system to produce components of the required marine vessel movements one degree of freedom at a time during a given iteration of control.

16 Claims, 7 Drawing Sheets

(51) Int. Cl.
  *B63H 21/21* (2006.01)
  *B63H 25/02* (2006.01)
(58) Field of Classification Search
  USPC .......................................................... 701/21
  See application file for complete search history.

(56) References Cited

U.S. PATENT DOCUMENTS

| | | | |
|---|---|---|---|
| 3,187,704 A | 6/1965 | Shatto et al. | |
| 3,673,553 A | 6/1972 | Miura et al. | |
| 3,688,252 A | 8/1972 | Thompson | |
| 3,707,717 A | 12/1972 | Frielinghaus | |
| 3,715,571 A | 2/1973 | Braddon | |
| 3,771,483 A | 11/1973 | Spencer | |
| 4,009,678 A | 3/1977 | North | |
| 4,220,111 A | 9/1980 | Krautkremer et al. | |
| 4,253,149 A | 2/1981 | Cunningham et al. | |
| 4,428,052 A | 1/1984 | Robinson et al. | |
| 4,513,378 A | 4/1985 | Antkowiak | |
| 4,519,335 A | 5/1985 | Krautkremer et al. | |
| 4,691,659 A | 9/1987 | Ito et al. | |
| 4,769,773 A | 9/1988 | Shatto, Jr. | |
| 4,939,661 A | 7/1990 | Barker et al. | |
| 4,975,709 A | 12/1990 | Koike | |
| 5,031,561 A | 7/1991 | Nilsson | |
| 5,090,929 A | 2/1992 | Rieben | |
| 5,108,325 A | 4/1992 | Livingston et al. | |
| 5,172,324 A | 12/1992 | Knight | |
| 5,202,835 A | 4/1993 | Knight | |
| 5,331,558 A | 7/1994 | Hossfield et al. | |
| 5,362,263 A | 11/1994 | Petty | |
| 5,386,368 A | 1/1995 | Knight | |
| 5,390,125 A | 2/1995 | Sennott et al. | |
| 5,491,636 A | 2/1996 | Robertson et al. | |
| 5,735,718 A | 4/1998 | Ekwall | |
| 5,736,962 A | 4/1998 | Tendler | |
| 5,755,605 A | 5/1998 | Asberg | |
| 5,884,213 A | 3/1999 | Carlson | |
| 5,995,527 A | 11/1999 | Ueta et al. | |
| 6,059,226 A | 5/2000 | Cotton et al. | |
| 6,092,007 A | 7/2000 | Cotton et al. | |
| 6,142,841 A | 11/2000 | Alexander et al. | |
| 6,230,642 B1 | 5/2001 | McKenney et al. | |
| 6,234,853 B1 | 5/2001 | Lanyi et al. | |
| 6,273,771 B1 | 8/2001 | Buckley et al. | |
| 6,308,651 B2 | 10/2001 | McKenney et al. | |
| 6,354,892 B1 | 3/2002 | Staerzl | |
| 6,357,375 B1 | 3/2002 | Ellis | |
| 6,377,889 B1 | 4/2002 | Soest | |
| 6,386,930 B2 | 5/2002 | Moffet | |
| 6,431,928 B1 | 8/2002 | Aarnivuo | |
| 6,446,003 B1 | 9/2002 | Green et al. | |
| 6,447,349 B1 | 9/2002 | Fadeley et al. | |
| 6,485,341 B1 | 11/2002 | Lanyi et al. | |
| 6,511,354 B1 | 1/2003 | Gonring et al. | |
| 6,604,479 B2 | 8/2003 | McKenney et al. | |
| 6,623,320 B1 | 9/2003 | Hedlund | |
| 6,677,889 B2 | 1/2004 | Van Rees et al. | |
| 6,678,589 B2 | 1/2004 | Robertson et al. | |
| 6,705,907 B1 | 3/2004 | Hedlund | |
| 6,707,414 B2 | 3/2004 | Van Rees et al. | |
| 6,712,654 B1 | 3/2004 | Putaansuu | |
| 6,757,606 B1 | 6/2004 | Gonring | |
| 6,848,382 B1 | 2/2005 | Bekker | |
| 6,978,729 B2 | 12/2005 | Bertetti et al. | |
| 6,994,046 B2 | 2/2006 | Kaji et al. | |
| 6,995,527 B2 | 2/2006 | Depasqua | |
| RE39,032 E | 3/2006 | Gonring et al. | |
| 7,131,385 B1 | 11/2006 | Ehlers et al. | |
| 7,220,153 B2 | 5/2007 | Okuyama | |
| 7,261,605 B2 | 8/2007 | Misao et al. | |
| 7,267,068 B2 | 9/2007 | Bradley et al. | |
| 7,268,703 B1 | 9/2007 | Kabel et al. | |
| 7,305,928 B2 | 12/2007 | Bradley et al. | |
| 7,366,593 B2 | 4/2008 | Fujimoto et al. | |
| 7,389,735 B2 | 6/2008 | Kaji et al. | |
| 7,398,742 B1 | 7/2008 | Gonring | |
| 7,416,458 B2 | 8/2008 | Suemori et al. | |
| 7,429,202 B2 | 9/2008 | Yazaki et al. | |
| 7,455,557 B2 | 11/2008 | Mizutani | |
| 7,467,595 B1 | 12/2008 | Lanyi et al. | |
| 7,476,134 B1 | 1/2009 | Fell et al. | |
| 7,538,511 B2 | 5/2009 | Samek | |
| 7,561,886 B1 | 7/2009 | Gonring et al. | |
| 7,577,526 B2 | 8/2009 | Kim et al. | |
| 7,727,036 B1 | 6/2010 | Poorman et al. | |
| 7,813,844 B2 | 10/2010 | Gensler et al. | |
| 7,876,430 B2 | 1/2011 | Montgomery | |
| 7,883,383 B2 | 2/2011 | Larsson | |
| 8,050,630 B1 | 11/2011 | Arbuckle | |
| 8,082,100 B2 | 12/2011 | Grace et al. | |
| 8,145,370 B2 | 3/2012 | Borrett | |
| 8,145,371 B2 | 3/2012 | Rae et al. | |
| 8,155,811 B2 | 4/2012 | Noffsinger et al. | |
| 8,215,252 B1 | 7/2012 | Chun | |
| 8,265,812 B2 | 9/2012 | Pease | |
| 8,417,399 B2 | 4/2013 | Arbuckle et al. | |
| 8,439,800 B1 | 5/2013 | Bazan et al. | |
| 8,478,464 B2 | 7/2013 | Arbuckle et al. | |
| 8,480,445 B2 | 7/2013 | Morvillo | |
| 8,510,028 B2 | 8/2013 | Grace et al. | |
| 8,515,660 B2 | 8/2013 | Grace et al. | |
| 8,515,661 B2 | 8/2013 | Grace et al. | |
| 8,527,192 B2 | 9/2013 | Grace et al. | |
| 8,543,324 B2 | 9/2013 | Grace et al. | |
| 8,622,778 B2 | 1/2014 | Tyers et al. | |
| 8,645,012 B2 | 2/2014 | Salmon et al. | |
| 8,694,248 B1 | 4/2014 | Arbuckle et al. | |
| 8,761,976 B2 | 6/2014 | Salmon et al. | |
| 8,777,681 B1 | 7/2014 | McNalley et al. | |
| 8,797,141 B2 | 8/2014 | Best et al. | |
| 8,807,059 B1 | 8/2014 | Samples et al. | |
| 8,831,868 B2 | 9/2014 | Grace et al. | |
| 8,924,054 B1 | 12/2014 | Arbuckle et al. | |
| 9,039,468 B1 | 5/2015 | Arbuckle et al. | |
| 9,114,865 B1 | 8/2015 | Gonring | |
| 9,132,900 B2 | 9/2015 | Salmon et al. | |
| 9,132,903 B1 | 9/2015 | Gable et al. | |
| 9,162,743 B2 | 10/2015 | Grace et al. | |
| 9,176,215 B2 | 11/2015 | Nikitin et al. | |
| 9,195,234 B2 | 11/2015 | Stephens | |
| 9,248,898 B1 | 2/2016 | Kirchhoff | |
| 9,359,057 B1 | 6/2016 | Andrasko et al. | |
| 9,377,780 B1 | 6/2016 | Arbuckle et al. | |
| 9,676,464 B2 | 6/2017 | Johnson et al. | |
| 9,694,885 B2 | 7/2017 | Combee | |
| 9,927,520 B1 | 3/2018 | Ward et al. | |
| 10,198,005 B2 | 2/2019 | Arbuckle et al. | |
| 2003/0137445 A1 | 7/2003 | Van Rees et al. | |
| 2003/0191562 A1 | 10/2003 | Robertson et al. | |
| 2004/0006423 A1* | 1/2004 | Fujimoto | G05D 1/0206 |
| | | | 701/467 |
| 2004/0221787 A1 | 11/2004 | McKenney et al. | |
| 2005/0170713 A1 | 8/2005 | Okuyama | |
| 2006/0089794 A1 | 4/2006 | Depasqua | |
| 2006/0116796 A1 | 6/2006 | Fossen et al. | |
| 2007/0017426 A1 | 1/2007 | Kaji et al. | |
| 2007/0032923 A1 | 2/2007 | Mossman et al. | |
| 2007/0073454 A1* | 3/2007 | Kaji | B63B 21/00 |
| | | | 701/21 |
| 2007/0089660 A1 | 4/2007 | Bradley et al. | |
| 2007/0162207 A1 | 7/2007 | Shimo et al. | |
| 2007/0178779 A1 | 8/2007 | Takada et al. | |
| 2007/0203623 A1 | 8/2007 | Saunders et al. | |
| 2007/0233389 A1 | 10/2007 | Stephens | |
| 2008/0033603 A1 | 2/2008 | Gensler et al. | |
| 2008/0289558 A1 | 11/2008 | Montgomery | |
| 2009/0037040 A1 | 2/2009 | Salmon et al. | |
| 2009/0171520 A1 | 7/2009 | Kaji | |
| 2009/0276148 A1 | 11/2009 | Ardvisson | |
| 2010/0023192 A1 | 1/2010 | Rae et al. | |
| 2010/0076683 A1 | 3/2010 | Chou | |
| 2010/0109944 A1 | 5/2010 | Whitehead et al. | |
| 2010/0138083 A1 | 6/2010 | Kaji | |

(56) References Cited

U.S. PATENT DOCUMENTS

| | | | |
|---|---|---|---|
| 2010/0145558 A1 | 6/2010 | Kaji | |
| 2011/0153126 A1 | 6/2011 | Arbuckle et al. | |
| 2011/0166724 A1 | 7/2011 | Hiramatsu | |
| 2011/0172858 A1* | 7/2011 | Gustin | B63H 21/213 701/21 |
| 2012/0072059 A1 | 3/2012 | Glaeser | |
| 2012/0129410 A1 | 5/2012 | Tyers | |
| 2012/0248259 A1 | 10/2012 | Page et al. | |
| 2013/0080044 A1 | 3/2013 | Tyers et al. | |
| 2013/0297104 A1 | 11/2013 | Tyers et al. | |
| 2015/0089427 A1 | 3/2015 | Akuzawa | |
| 2015/0277442 A1 | 10/2015 | Ballou | |
| 2015/0346722 A1 | 12/2015 | Herz et al. | |
| 2015/0346730 A1 | 12/2015 | Stephens et al. | |
| 2016/0101838 A1 | 4/2016 | Kojima | |
| 2016/0125739 A1 | 5/2016 | Stewart et al. | |
| 2016/0246300 A1 | 8/2016 | Langford-Wood | |
| 2016/0252907 A1 | 9/2016 | Parkinson | |
| 2016/0334792 A1 | 11/2016 | Jopling | |
| 2017/0205828 A1 | 7/2017 | Estabrook | |
| 2017/0205829 A1* | 7/2017 | Tyers | G05D 1/0206 |
| 2017/0210449 A1 | 7/2017 | Frisbie et al. | |
| 2017/0253314 A1 | 9/2017 | Ward | |
| 2017/0255200 A1 | 9/2017 | Arbuckle et al. | |
| 2017/0277189 A1 | 9/2017 | Johnson et al. | |
| 2017/0349257 A1 | 12/2017 | Hara et al. | |
| 2017/0365175 A1 | 12/2017 | Harnett | |
| 2018/0015994 A1 | 1/2018 | Kishimoto et al. | |
| 2018/0057132 A1 | 3/2018 | Ward et al. | |

FOREIGN PATENT DOCUMENTS

| | | | | |
|---|---|---|---|---|
| EP | 2161542 A1 | 3/2010 | | |
| EP | 3210878 | 8/2017 | | |
| GB | 1173442 | 12/1969 | | |
| GB | 2180374 A | 3/1987 | | |
| JP | 58061097 | 4/1983 | | |
| JP | 04101206 A | 2/1992 | | |
| JP | 06286694 A * | 10/1994 | | |
| JP | 07223591 | 8/1995 | | |
| JP | 2926533 B2 | 7/1997 | | |
| JP | 11-129978 A | 5/1999 | | |
| JP | 2002173091 A | 6/2002 | | |
| JP | 2003276677 A | 10/2003 | | |
| JP | 2005212693 A * | 8/2005 | | B63B 21/00 |
| JP | 2005231407 A * | 9/2005 | | B63H 25/46 |
| JP | 2006137309 A | 6/2006 | | |
| JP | 2007248336 A | 9/2007 | | |
| JP | 2008201225 A | 9/2008 | | |
| JP | 2009-227035 A | 10/2009 | | |
| JP | 2009-241738 A | 10/2009 | | |
| JP | 2011128943 A | 6/2011 | | |
| JP | 5042906 B2 | 7/2012 | | |
| JP | 05-203638 A | 11/2012 | | |
| JP | 2012528417 A | 11/2012 | | |
| JP | 5226355 B2 | 7/2013 | | |
| JP | 2014065495 A | 4/2014 | | |
| KR | 20060072293 A | 6/2006 | | |
| WO | 9205505 A1 | 4/1992 | | |
| WO | 2006058400 A1 | 6/2006 | | |
| WO | 2008111249 A1 | 9/2008 | | |
| WO | 2016104030 | 6/2016 | | |
| WO | 2016104031 A1 | 6/2016 | | |
| WO | WO 2018073731 | 4/2018 | | |

OTHER PUBLICATIONS

Triantafyllou et al., Maneuvering and Control of Marine Vehicles, Nov. 2003, Department of Ocean Engineering, Massachusetts Institute of Technology (Pertinent Pages: 17-18) (Year: 2003).*

Heap et al., "Systems and Methods for Automatically Trailering a Marine Vessel on a Boat Trailer", Unpublished U.S. Appl. No. 15/377,612, filed Dec. 13, 2016.

Ward et al., "Methods for Controlling Movement of a Marine Vessel Near an Object", Unpublished U.S. Appl. No. 15/246,681, filed Aug. 25, 2016.

Ward et al., "Marine Vessel Station Keeping Systems and Methods", Unpublished U.S. Appl. No. 15/138,860, filed Apr. 26, 2016.

Ward et al, "Method and System for Close Proximity Collision Detection", U.S. Appl. No. 14/807,217, filed Jul. 23, 2015.

Poorman et al., "Multilayer Control System and Method for Controlling Movement of a Marine Vessel", U.S. Appl. No. 11/965,583, filed Dec. 27, 2007.

Andrasko et al., "System and Method for Controlling Handling of a Marine Vessel", U.S. Appl. No. 14/484,702, filed Sep. 12, 2014.

Mercury Marine, Axius Generation 2 Installation Manual, Jul. 2010, pp. 22-25.

Mercury Marine, Joystick Piloting for Outboards Operation Manual, 2013, pp. 24-26.

Mercury Marine, Zeus 3000 Series Pod Drive Models Operation Manual, 2013, pp. 49-52.

Trolley Scan (PTY) LTD, "RFID-Radar—How it Works," web article, web page accessed Oct. 3, 2016, available at http://www.rfidradar.com/howworks.html.

Open CV, "Detection of ArUco Markers," web article, Dec. 18, 2015, web page last accessed Nov. 29, 2016, available at http://docs.opencv.org/3.1.0/d5/dae/tutorial_aruco_detection.html.

Ward et al., "Methods for Controlling Movement of a Marine Vessel Near and Object," Unpublished U.S. Appl. No. 15/986,395, filed May 22, 2018.

Arbuckle et al., "System and Method for Controlling a Position of a Marine Vessel Near an Object," Unpublished U.S. Appl. No. 15/818,226, filed Nov. 20, 2017.

Extended European Search Report issued in corresponding EP Application No. 18206234.9 dated Mar. 25, 2019.

* cited by examiner

SYSTEM AND METHOD FOR CONTROLLING A POSITION OF A MARINE VESSEL NEAR AN OBJECT

FIELD

The present disclosure relates to systems and methods for controlling movement and position of a marine vessel in a body of water.

BACKGROUND

U.S. Pat. No. 6,273,771 discloses a control system for a marine vessel that incorporates a marine propulsion system that can be attached to a marine vessel and connected in signal communication with a serial communication bus and a controller. A plurality of input devices and output devices are also connected in signal communication with the communication bus and a bus access manager, such as a CAN Kingdom network, is connected in signal communication with the controller to regulate the incorporation of additional devices to the plurality of devices in signal communication with the bus whereby the controller is connected in signal communication with each of the plurality of devices on the communication bus. The input and output devices can each transmit messages to the serial communication bus for receipt by other devices.

U.S. Pat. No. 7,267,068 discloses a marine vessel that is maneuvered by independently rotating first and second marine propulsion devices about their respective steering axes in response to commands received from a manually operable control device, such as a joystick. The marine propulsion devices are aligned with their thrust vectors intersecting at a point on a centerline of the marine vessel and, when no rotational movement is commanded, at the center of gravity of the marine vessel. Internal combustion engines are provided to drive the marine propulsion devices. The steering axes of the two marine propulsion devices are generally vertical and parallel to each other. The two steering axes extend through a bottom surface of the hull of the marine vessel.

U.S. Pat. No. 7,305,928 discloses a vessel positioning system that maneuvers a marine vessel in such a way that the vessel maintains its global position and heading in accordance with a desired position and heading selected by the operator of the marine vessel. When used in conjunction with a joystick, the operator of the marine vessel can place the system in a station keeping enabled mode and the system then maintains the desired position obtained upon the initial change in the joystick from an active mode to an inactive mode. In this way, the operator can selectively maneuver the marine vessel manually and, when the joystick is released, the vessel will maintain the position in which it was at the instant the operator stopped maneuvering it with the joystick.

Unpublished U.S. patent application Ser. No. 15/138,860, filed Apr. 26, 2016, discloses a system for maintaining a marine vessel in a body of water at a selected position and orientation, including a global positioning system that determines a global position and heading of the vessel and a proximity sensor that determines a relative position and bearing of the vessel with respect to an object near the vessel. A controller operable in a station keeping mode is in signal communication with the GPS and the proximity sensor. The controller chooses between using global position and heading data from the GPS and relative position and bearing data from the proximity sensor to determine if the vessel has moved from the selected position and orientation. The controller calculates thrust commands required to return the vessel to the selected position and orientation and outputs the thrust commands to a marine propulsion system, which uses the thrust commands to reposition the vessel.

Unpublished U.S. patent application Ser. No. 15/246,681, filed Aug. 25, 2016, discloses a method for controlling movement of a marine vessel near an object, including accepting a signal representing a desired movement of the marine vessel from a joystick. A sensor senses a shortest distance between the object and the marine vessel and a direction of the object with respect to the marine vessel. A controller compares the desired movement of the marine vessel with the shortest distance and the direction. Based on the comparison, the controller selects whether to command the marine propulsion system to generate thrust to achieve the desired movement, or alternatively whether to command the marine propulsion system to generate thrust to achieve a modified movement that ensures the marine vessel maintains at least a predetermined range from the object. The marine propulsion system then generates thrust to achieve the desired movement or the modified movement, as commanded.

Unpublished U.S. patent application Ser. No. 15/377,612, filed Dec. 13, 2016, discloses a system for automatically trailering a marine vessel, including a set of coded tags coupled to a boat trailer, each storing data regarding its location on the trailer. A tag reader is located aboard the vessel, and estimates a first distance to a first coded tag in the set and a second distance to a second coded tag in the set. A position determination module uses the first and second estimated distances to determine position and heading of the vessel and the trailer in a given coordinate system. A feedback control module calculates a difference between the positions of the vessel and the trailer and a difference between the headings of the vessel and the trailer and determines vessel movements required to minimize the position and heading differences. A marine propulsion system automatically actuates a propulsion device to produce the required vessel movements to propel the vessel onto the trailer.

Unpublished U.S. patent application Ser. No. 15/416,359, filed Jan. 26, 2017, discloses a method for controlling movement of a marine vessel, including controlling a propulsion device to automatically maneuver the vessel along a track including a series of waypoints, and determining whether the next waypoint is a stopover waypoint at or near which the vessel is to electronically anchor. If the next waypoint is the stopover waypoint, a control module calculates a distance between the vessel and the stopover waypoint. In response to the calculated distance being less than or equal to a threshold distance, the propulsion device's thrust is decreased. In response to sensing that the vessel thereafter slows to a first threshold speed, the vessel's speed is further reduced. In response to sensing that the vessel thereafter slows to a second, lower threshold speed or passes the stopover waypoint, the propulsion device is controlled to maintain the vessel at an anchor point that is at or near the stopover waypoint.

The above patents and applications are hereby incorporated by reference herein in their entireties.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

According to one example of the present disclosure, a method for controlling a position of a marine vessel near a target location is disclosed. The marine vessel is powered by a marine propulsion system and is movable with respect to first, second, and third axes that are perpendicular to one another and define six degrees of freedom of potential vessel movement. The method includes measuring a present location of the marine vessel, and based on the marine vessel's present location, determining with a control module if the marine vessel is within a predetermined range of the target location. The method includes determining, with the control module, marine vessel movements that are required to translate the marine vessel from the present location to the target location. In response to the marine vessel being within the predetermined range of the target location, the method includes automatically controlling the propulsion system with the control module to produce components of the required marine vessel movements one degree of freedom at a time during a given iteration of control.

According to another example of the present disclosure, a system controls a position of a marine vessel near an object, the marine vessel being movable with respect to first, second, and third axes that are perpendicular to one another and define six degrees of freedom of potential vessel movement. The system includes a location sensor that measures a present location of the marine vessel and a heading sensor that determines a present heading of the marine vessel. A control module is in signal communication with the location sensor and the heading sensor. A marine propulsion system is in signal communication with the control module. The control module determines marine vessel movements that are required to translate the marine vessel from the present location to the target location and to rotate the marine vessel from the present heading to the target heading. The control module controls the propulsion system to produce components of the required marine vessel movements no more than two degrees of freedom at a time during a given iteration of control.

BRIEF DESCRIPTION OF THE DRAWINGS

Examples of systems and methods for controlling a position of a marine vessel are described with reference to the following Figures. The same numbers are used throughout the Figures to reference like features and like components.

DETAILED DESCRIPTION

In the present description, certain terms have been used for brevity, clarity, and understanding. No unnecessary limitations are to be implied therefrom beyond the requirement of the prior art because such terms are used for descriptive purposes only and are intended to be broadly construed.

FIGS. 1-4 schematically depict a marine vessel and a control system for orienting and maneuvering a marine vessel. It should be understood that the particular configuration of the marine vessel, propulsion system, and control system shown and described is exemplary. It is possible to apply the concepts described in the present disclosure with substantially different configurations therefor. For example, the marine vessel that is depicted has two marine propulsion devices. However, it should be understood that the concepts of the present disclosure are applicable to marine vessels having any number of marine propulsion devices. Additionally, although the present disclosure describes the propulsion devices as being outboard motors, other arrangements such as an inboard arrangements, stern drive arrangements, pod arrangements, etc. using propellers, impellers, jets, or the like can be controlled according to the same principles and methods. The control system described herein includes certain operational structures such as global positioning system (GPS) devices and inertial measurement units (IMUs). It should be understood that the concepts of the present disclosure are capable of being implemented with different types of systems for acquiring global position data and are not limited to the specific types and numbers of such devices described and depicted herein. Further, the present disclosure describes certain types of user input devices. It should also be recognized that the concepts disclosed in the present disclosure are applicable in a preprogrammed format without user input, or in conjunction with different types of user input devices, as known to one of skill in the art. Further equivalents, alternatives and modifications are possible as would be recognized by those skilled in the art.

Figure 1:
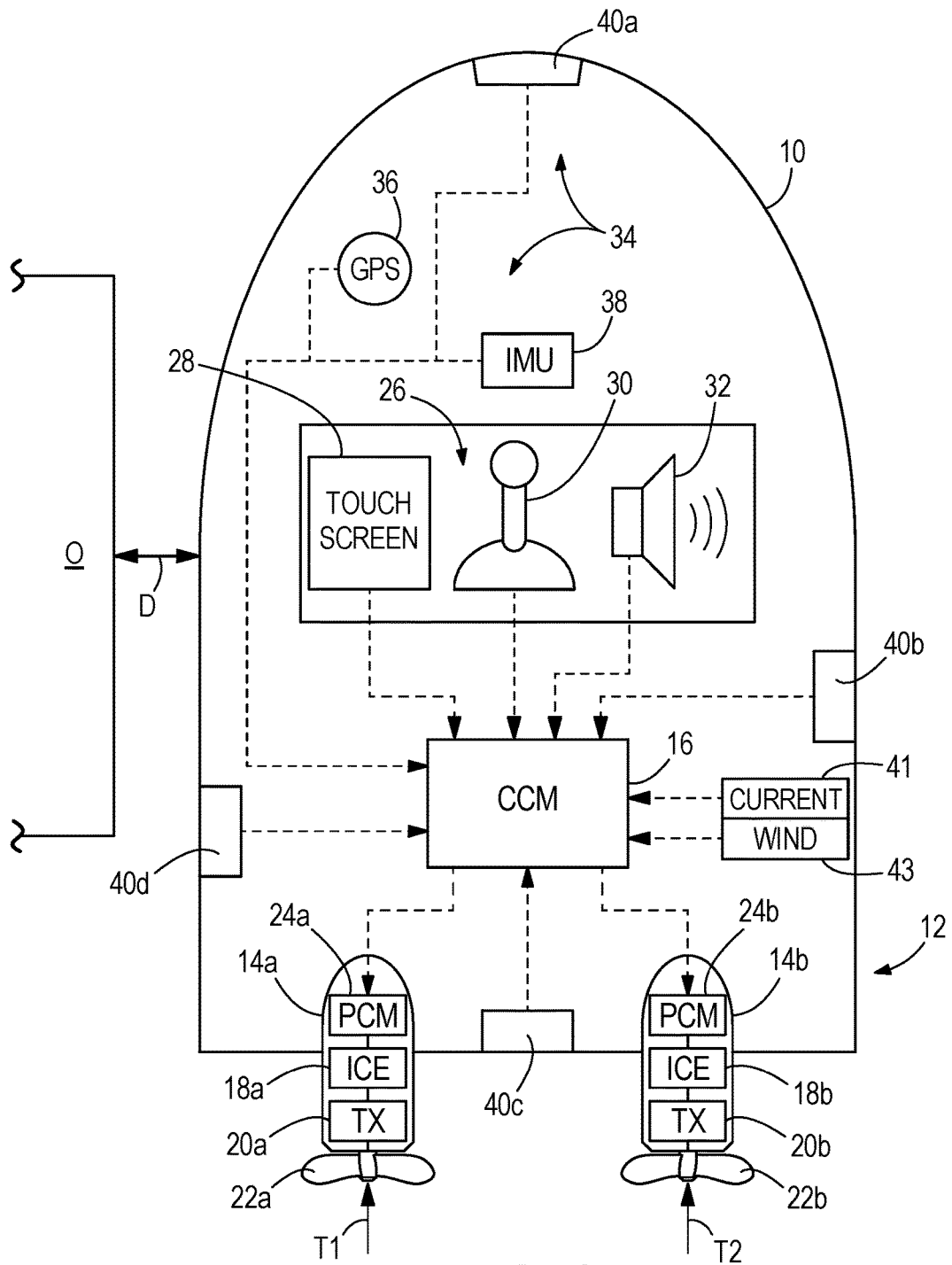
FIG. 1 is a schematic representation of a control system on a marine vessel.

A schematic of an exemplary marine vessel 10 is provided in FIG. 1. The marine vessel 10 includes a marine propulsion system 12 including two marine propulsion devices 14a, 14b. The marine propulsion system 12 is in signal communication with a control module 16. The control module 16 (here, shown as a command control module or "CCM") controls the magnitudes of thrusts T1, T2 of the propulsion devices 14a, 14b, such as by controlling speed of their internal combustion engines 18a, 18b and thus their propellers 22a, 22b. The control module 16 also controls shift positions of the propulsion devices 14a, 14b between forward, neutral, and reverse by way of transmissions 20a, 20b. The control module 16 also controls the steering angles of the propulsion devices 14a, 14b, which affect the angles of their thrusts T1, T2 with respect to an imaginary centerline of the marine vessel 10 running from bow to stern (see 42, FIGS. 3 and 4). The steering angles and shift positions of the propulsion devices 14a, 14b can be controlled directly by the control module 16, or can be controlled by way of separate propulsion control modules ("PCM") 24a, 24b provided for each propulsion device 14a, 14b.

A command console 26 on the marine vessel 10 includes an electronic display screen, such as the touch screen 28 shown herein. Note that in other embodiments, the display screen may additionally or alternatively be associated with a keypad and may not be capable of receiving touch inputs. The touch screen 28 may provide the operator of the marine vessel 10 with the ability to select one or more modes in which to operate the marine vessel 10, such as, but not limited to, an auto-docking mode, which will be described further herein below. A joystick 30 is also provided at the command console 26 and can provide steering commands, shift commands, and thrust commands to the propulsion devices 14a, 14b via the control module 16, as is known. Although not shown herein, in other examples, a steering wheel is provided for inputting steering commands to the propulsion device 14a, 14b, and a pair of throttle/shift levers is provided for inputting shift commands to the transmissions 20a, 20b and engine speed commands to the engines 18a, 18b, as is also known. An audio output device 32, such as a horn, buzzer, loudspeaker, or other device capable of producing sound, is also provided at the command console 26 and in signal communication with the control module 16.

The marine vessel 10 includes numerous sensors, including a location sensor that determines a location of the marine vessel 10, a speed sensor that determines a speed of the marine vessel 10, a direction sensor that senses a direction of travel of the marine vessel 10, and a rotational sensor that senses a direction of rotation of the marine vessel 10. In fact, the marine vessel 10 can be provided with multiple location sensors 34, such as a global positioning system (GPS) receiver 36, an inertial measurement unit (IMU) 38, and several proximity sensors and/or vision-based sensors 40a-40d. In one example, the GPS receiver 36 serves as each of the location sensor, the speed sensor, and the direction sensor. The GPS receiver 36 provides to the control module 16 a present, actual geographic location of the marine vessel 10 in latitude and longitude. The GPS receiver 36 can also serve as the speed sensor, as it determines the speed of the marine vessel 10 over ground ("SOG") by determining how far the marine vessel 10 travels, as determined from GPS position, over a given period of time. The control module 16 may use an average or filtered value of SOG as being the vessel's speed. In other examples, a pitot tube or paddle wheel type speed sensor may be included. The GPS receiver 36 can also act as the direction sensor, as it determines the course over ground (COG) of the marine vessel 10 based on changing geographical location. The IMU 38 may alternatively or additionally serve as the direction sensor, as it detects a present, actual heading of the marine vessel 10. In other examples, the direction sensor is a simple compass. The IMU 38 may also act as the rotational sensor, as it is capable of detecting a change in heading over time, otherwise known as yaw rate or angular velocity. The IMU 38 can be, for example, part 8M0048162 available from Mercury Marine of Fond du Lac, Wis. In certain embodiments of the IMU 38, it comprises a differential correction receiver, accelerometers, angular rate sensors, and a microprocessor which manipulates the information obtained from these devices to provide information relating to the present position of the marine vessel 10, in terms of longitude and latitude, the present heading of the marine vessel 10 with respect to north, and the velocity and acceleration of the marine vessel 10 in six degrees of freedom. In some examples, the location sensor, speed sensor, direction sensor, and rotational sensor are part of a single device, such as an attitude and heading reference system (AHRS). As shown, the control module 16 is in signal communication with the location sensor(s) 34 and the speed sensor(s) (e.g., GPS receiver 36).

Although one proximity sensor and/or vision-based sensor 40a-40d is shown on each of the bow, stern, and port and starboard sides of the marine vessel 10, fewer or more sensors could be provided at each location. The sensors 40a-40d are used as location sensors, and for example could be radars, sonars, LiDAR devices, cameras, lasers, Doppler direction finders, or other devices individually capable of determining both the relative location and distance to an object O near the marine vessel 10, such as a dock, seawall, slip, buoy, shoreline, large rock or tree, etc. In some examples, the proximity sensors can be RFID receivers, and RFID tags can be placed on the object O at strategic positions. In other embodiments, the RFID receivers may instead be radio frequency identification and geometry (RFIG) units, which determine location, poise, motion, and orientation information using photovoltaic components and IR-LEDs on the receiver's integrated circuit. The vision-based sensors can be cameras. The control module 16 can be programmed with a computer vision algorithm that allows it to interpret photographs or video from the cameras. The algorithms can detect the location and basic contours of the object O. Alternatively, ArUco markers could be provided at strategic locations on the object O, and the algorithms could detect the location of the ArUco markers. For example, the camera sensor(s) would determine the scale and orientation of the ArUco markers and could thereafter determine their 3-D locations from a 2-D image.

The proximity and/or vision-based sensors 40a-40d may be provided at locations on the marine vessel 10 other than those shown herein. Fewer or more proximity and/or vision-based sensors 40a-40d than shown can also be provided. The proximity and/or vision-based sensors 40a-40d can all be of the same type, or can be of varied types. Ideally, the object O has enough physical variance that it can provide a three-dimensional picture to the proximity and/or vision-based sensors 40a-40d such that the sensors 40a-40d can tell one part of the object O from another part of the object O. Note that if many proximity sensors are used, the data they provide can be used to create a virtual map or virtual photograph of the nearby object O.

Relative position and bearing data from the proximity and/or vision-based sensors 40a-40d can be used in order to provide measurement resolution and accuracy much higher than that of the GPS receiver 36. For example, SOG from the GPS receiver 36 is noisy at low speeds, seeing as GPS location does not change much over time when the marine vessel 10 is moving slowly. The proximity and/or vision-based sensors 40a-40d could therefore be used to determine vessel speed at low speeds, such as by regularly measuring a distance D between the marine vessel 10 and the object O, and calculating a change in the measured distance D over time. In one example, the control module 16 chooses to use data from the sensors 40a-40d for purposes of location and speed determination when the GPS receiver 36 or IMU 38 reports that the marine vessel 10 is within a predetermined range R (described below with respect to FIGS. 7 and 8) of a target geographical location TL (described below with respect to FIG. 2). The predetermined range R may be measured from the center of gravity of the marine vessel 10, from the outer edge of the hull, from the GPS receiver 36 or IMU 38, or from the proximity sensor nearest the object O, depending on system calibration. In another example, the control module 16 chooses to use data from the sensors 40a-40d for purposes of location and speed determination if the GPS receiver 36, IMU 38, or proximity sensors 40a-40d report that the marine vessel 10 is within a predefined switching threshold distance from the object O.

The control module 16 is programmable and includes a processing system and a storage system. The control module 16 can be located anywhere on the marine vessel 10 and/or located remote from the marine vessel 10 and can communicate with various components of the marine vessel 10 via a peripheral interface and wired and/or wireless links. Although FIG. 1 shows several control modules (CCM 16, PCMs 24a, 24b), the marine vessel 10 can include only one control module. Portions of the method disclosed herein below can be carried out by a single control module or by several separate control modules. If more than one control module is provided, each can control operation of a specific device or sub-system on the marine vessel 10. For example, the PCMs 24a, 24b can interpret and carry out commands from the CCM control module 16 in order to produce the thrusts T1, T2, rotate the propulsion devices 14a, 14b to different steering angles, change the speed of the engines 18a, 18b, and change shift positions via the transmissions 20a, 20b. In alternative embodiments, the command control module 16 directly controls these functions of the propulsion devices 14a, 14b.

In some examples, the control module 16 may include a computing system that includes a processing system, storage system, software, and an input/output (I/O) interface for communicating with peripheral devices. The systems may be implemented in hardware and/or software that carry out a programmed set of instructions. For example, the processing system loads and executes software from the storage system, such as software programmed with an auto-docking method, which directs the processing system to operate as described herein below in further detail. The computing system may include one or more processors, which may be communicatively connected. The processing system can comprise a microprocessor, including a control unit and a processing unit, and other circuitry, such as semiconductor hardware logic, that retrieves and executes software from the storage system.

As used herein, the term "control module" may refer to, be part of, or include an application specific integrated circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip (SoC). A control module may include memory (shared, dedicated, or group) that stores code executed by the processing system. The term "code" may include software, firmware, and/or microcode, and may refer to programs, routines, functions, classes, and/or objects. The term "shared" means that some or all code from multiple modules may be executed using a single (shared) processor. In addition, some or all code from multiple control modules may be stored by a single (shared) memory. The term "group" means that some or all code from a single control module may be executed using a group of processors. In addition, some or all code from a single control module may be stored using a group of memories.

The storage system can comprise any storage media readable by the processing system and capable of storing software. The storage system can include volatile and non-volatile, removable and non-removable media implemented in any method or technology for storage of information, such as computer-readable instructions, data structures, software modules, or other data. The storage system can include additional elements, such as a memory controller capable of communicating with the processing system. Non-limiting examples of storage media include random access memory, read-only memory, magnetic discs, optical discs, flash memory, virtual and non-virtual memory, various types of magnetic storage devices, or any other medium which can be used to store the desired information and that may be accessed by an instruction execution system. The storage media can be a transitory storage media or a non-transitory storage media such as a non-transitory tangible computer readable medium.

The control module 16 communicates with one or more of the components on the marine vessel 10 via the I/O interface and a communication link. In one example, the communication link is a controller area network (CAN) bus, but other types of links could be used. The I/O interface allows the control module 16 to interact both with input devices, such as the touch screen 28, joystick 30, GPS receiver 36, IMU 38, and proximity and/or vision based sensors 40a-40d, as well as with output devices such as the touch screen 28, audio output device 32, and the propulsion devices 14a, 14b. Other types of devices can be provided in signal communication with the control module 16, such as keyboards, remote controls, voice command receivers, keypads, buttons, etc., any of which may be part of the command console 26.

Figure 2:
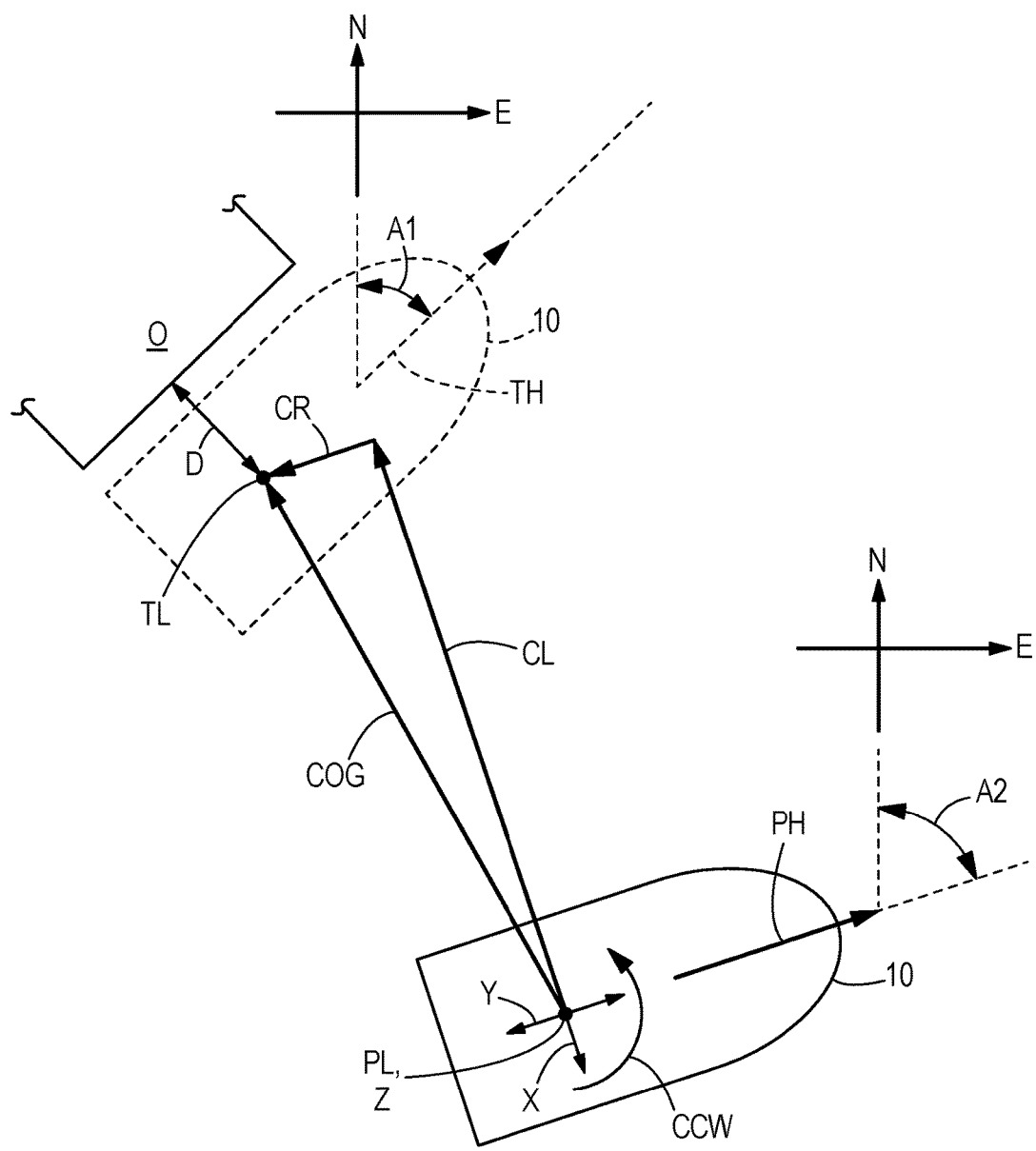
FIG. 2 is a schematic used to explain how the marine vessel can be moved from a present location to a target location.

Referring to FIG. 2, in an auto-docking mode, the control module 16 controls the propulsion system 12 to reduce a difference between the marine vessel's present location PL as determined by the GPS receiver 36 and a predetermined target location TL proximate the object O. The marine vessel 10 can be moved to a predetermined target global position (defined by latitude and longitude) and to a predetermined target heading by way of an algorithm that controls the vessel's propulsion devices 14a, 14b to drive the vessel's position error and heading error to zero. The target location TL and target heading TH can be input by the operator via the touch screen 28, such as by selecting the target location from a user-interactive map and inputting the target heading as a numerical value or by way of a finger swipe. The target heading and target location may instead be selected by positioning the marine vessel 10 at the desired location and desired heading near the object O and then pressing a button to store the actual, measured location and measured heading at that moment. In either example, the target heading TH and target location TL can be saved for later recall by the press of a button or selection of the auto-docking mode, especially in the instance where the marine vessel 10 is frequently docked near the same object O.

Note that the target location TL need not be defined only in terms of a geographical location for purposes carrying out the present disclosure. For instance, the control module 16 can be programmed to determine if the marine vessel 10 is within a given distance D of the object O, which given distance D at least in part defines target location TL. Specifically, while the control module 16 controls the propulsion system 12 to reduce the difference between the marine vessel's location as determined by the GPS receiver 36 and the predetermined latitude and longitude-defined target location TL, the control module 16 also determines if the marine vessel 10 is within the given distance D of the object O based on the marine vessel's location as determined by the proximity sensor(s) and/or the vision-based sensor(s) 40a-40d. As mentioned herein above, the proximity and/or vision based sensors 40a-40d may have greater accuracy at close range than does the GPS receiver 36. Thus, the proximity and/or vision-based sensors 40a-40d may more accurately report when the marine vessel 10 has reached the target location TL at the given distance D from the object O. In other words, although the marine vessel 10 may initially be controlled toward the target location TL using information from the GPS receiver 36, the control module 16 may switch to using information from the sensors 40a-40d to determine when the marine vessel 10 is within the given distance D of the object O. For example, the switch may be made when the GPS receiver 36 or IMU 38 reports that the marine vessel 10 is within a predetermined range R of the target location TL, or when the GPS receiver 36, IMU 38, or proximity sensors 40a-40d report that the marine vessel 10 is within a switching threshold distance from the object O, as noted herein above.

A comparison of FIG. 1 with FIG. 2 illustrates that the given distance D can be defined as the reading taken directly from one of the sensors 40a-40d on the side of the marine vessel 10, or can be defined as the reading from one of the sensors 40a-40d plus half the width of the marine vessel 10, depending on how the software is code is written. Note that if the GPS receiver 36 is used to determine that the marine vessel 10 is at the target location TL, the given distance D might be pre-defined as being the distance between the location of the GPS receiver 36 and the nearest edge of the object O, or the control module 16 may be programmed to take into account the geometry (such as the width) of the marine vessel 10 in order to determine if a side of the marine vessel 10 is within the given distance D of the nearest edge of the object O. If the proximity and/or vision-based sensors 40a-40d are used to determine that the marine vessel 10 is within the given distance D of the object O, depending on the number and location(s) of the sensors 40a-40d and the size of the object O, the control module 16 may need to calculate a lateral distance between the marine vessel 10 and the object O based on the measured distance of the object O from the sensor 40a-40d and the angle at which the object O is situated with respect to the sensor 40a-40d.

In the example of FIG. 2, the present location PL of a preselected point on the marine vessel 10, as determined by the GPS receiver 36, is not equal to the predetermined target location TL, and thus the control module 16 will calculate a course over ground (COG) that the marine vessel 10 must travel to reach the target location TL. This COG is a vector pointing directly from the present location PL to the target location TL. However, it should be understood that this vector COG can also be defined by the combination of a component CL of the required vessel movement that is directly leftward with respect to the vessel's initial orientation and a component CR of the required vessel movement that is directly rearward with respect to the vessel's initial orientation. Additionally, a predetermined target heading TH is at angle A1 from north, while the present heading PH read from the compass or the IMU 38 is at angle A2 from north. The control module 16 will therefore determine that a counterclockwise yaw movement (arrow CCW) of A2-A1 degrees is required to orient the marine vessel 10 at the target heading TH. (Note that the present location PL and present heading PH need not be the initial, starting position and orientation of the marine vessel 10, but could instead be an intermediate position/orientation of the marine vessel 10 during the auto-docking procedure, at which the marine vessel 10 is located while approaching the target location TL near the object O.)

Still referring to FIG. 2, the marine vessel 10 can move with respect to three axes: a horizontal x-axis defined in a fore/aft direction, a horizontal y-axis defined in a left/right direction, and a vertical (into the page) z-axis, which are each perpendicular to one another. The control module 16 determines how much propulsive action to take to reach the target location TL and the target heading TH according to a three-dimensional (left/right, fore/aft, and yaw) proportional, integral, and derivative (PID) control algorithm performed by a feedback controller of the control module 16. The feedback controller computes a desired force in the forward/back and left/right directions with reference to the marine vessel 10, along with a desired yaw moment about the z-axis, in order to null the error elements. The computed force and moment elements are then transmitted to the marine propulsion system 12, which delivers the requested forces and moments by positioning the independently steerable propulsion devices 14a, 14b, controlling the power provided to the propellers 22a, 22b of each device, and controlling the thrust vector directions of both devices via the transmissions 20a, 20b. As will be described further herein below, the control module 16 determines how to order and/or combine such control actions based on whether the marine vessel 10 is within a predetermined range of the target location TL. Briefly, the control module 16 may determine marine vessel movements that are required to translate the marine vessel 10 from the present location PL to the target location TL and to rotate the marine vessel 10 from the present heading PH to the target heading TH. When the marine vessel 10 is outside of a predetermined range from the target location TL, the control module 16 may control the propulsion system 12 to reduce these errors by translating and rotating the marine vessel 10 at the same time. On the other hand, when the marine vessel 10 is within the predetermined range of the target location TL, the control module 16 may control the propulsion system 12 to produce components of the required marine vessel movements no more than two degrees of freedom at a time during a given iteration of control. In some examples, the propulsion system 12 produces the components of the required marine vessel movements only one degree of freedom at a time during a given iteration of control.

Figure 4:
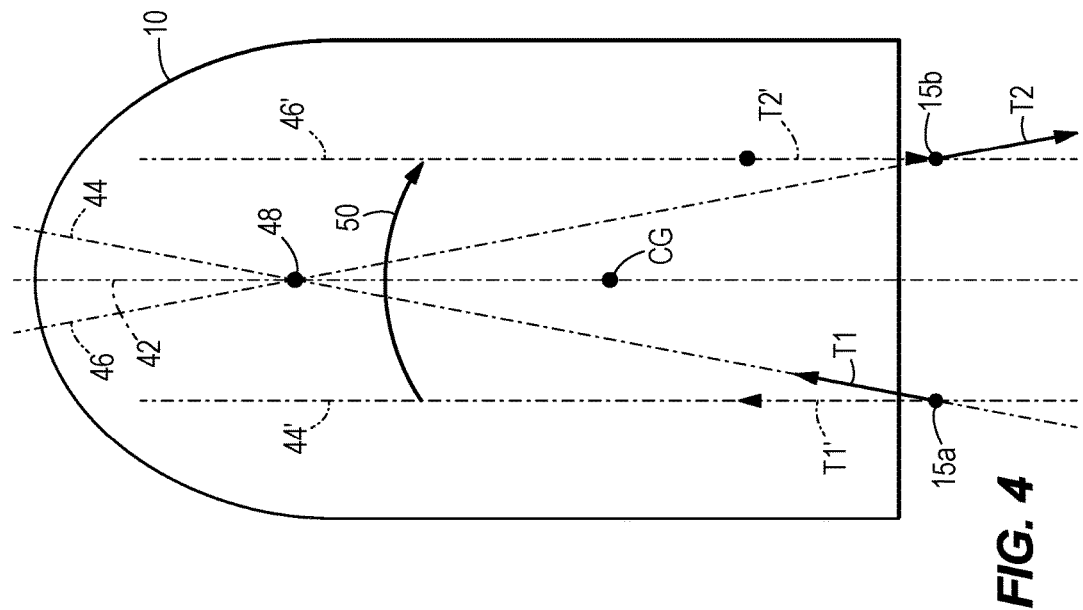
FIGS. 3 and 4 illustrate arrangements of thrust vectors used to achieve a particular movement of the marine vessel.
Figure 3:
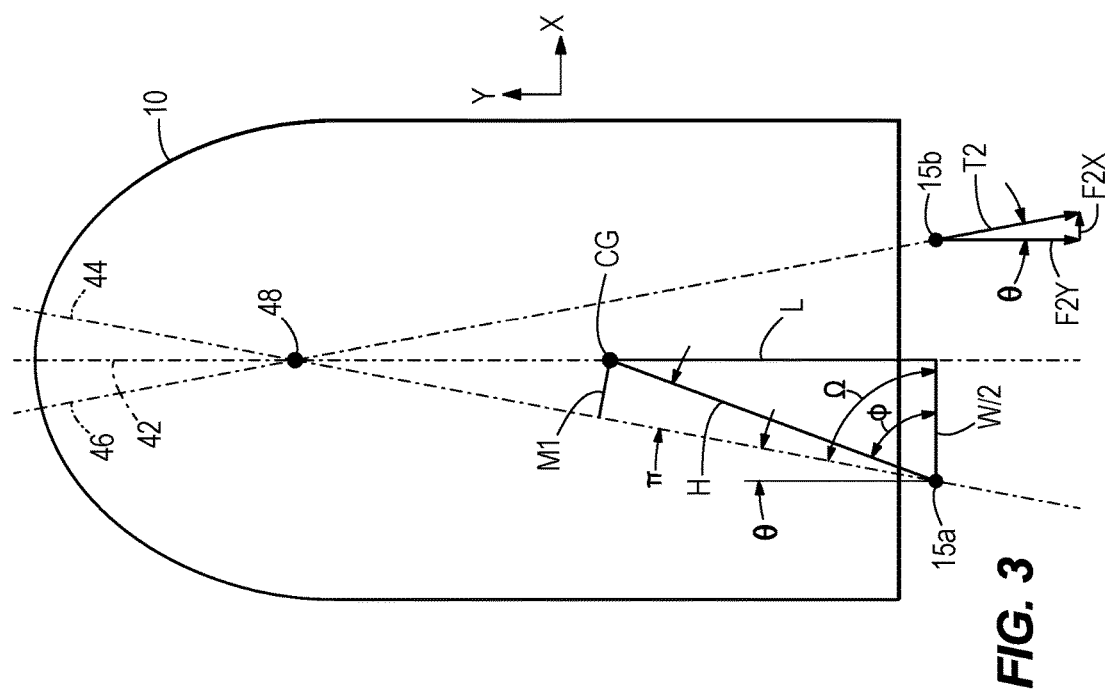

As illustrated in FIGS. 3 and 4, when a rotation of the marine vessel 10 is desired in combination with linear movement (as noted above, such a maneuver may only be allowed when the vessel is outside of the predetermined range of the target location TL), the propulsion devices 14a, 14b are rotated about their respective steering axes 15a, 15b to steering angles θ with respect to a centerline 42 of the marine vessel 10 so that their thrust vectors intersect at a point on the centerline 42. Although thrust vector T1 is not shown in FIG. 3 for purposes of clarity (see FIG. 4 for its magnitude and direction), its associated line of action 44 is shown intersecting with a line of action 46 of thrust vector T2 at a point 48. Because the point 48 is not coincident with the center of gravity CG of the marine vessel 10, an effective moment arm M1 exists with respect to the thrust T1 produced by the propulsion device 14a. The moment about the center of gravity CG is equivalent to the magnitude of the thrust vector T1 multiplied by dimension M1. Moment arm M1 is perpendicular to dashed line 44 along which the first thrust vector T1 is aligned. As such, it is one side of a right triangle which also comprises a hypotenuse H. It should also be understood that another right triangle in FIG. 3 comprises sides L, W/2, and the hypotenuse H. So long as the propulsion devices 14a, 14b are rotated about their respective steering axes 15a, 15b by the same angle θ, a moment arm M2 (not shown for purposes of clarity) of equal magnitude to moment arm M1 would exist with respect to the second thrust vector T2 directed along dashed line 46.

With continued reference to FIG. 3, those skilled in the art will recognize that the length of the moment arm M1 can be determined as a function of steering angle θ; angle Φ; angle π; the distance between the first and second steering axes 15a and 15b, which is equal to W in FIG. 3; and the perpendicular distance L between the center of gravity CG and a line extending between the first and second steering axes 15a, 15b. The length of the line extending between the first steering axis 15a and the center of gravity CG is the hypotenuse H of a right triangle and can easily be determined using the Pythagorean Theorem given L and W, which are known and saved in the control module's memory.

The magnitude of θ is calculated as described herein below with respect to equations 1-4. The magnitude of angle Ω is 90-θ. The magnitude of angle Φ is equivalent to the arctangent of the ratio of length L to the distance between the first steering axis 15a and the vessel's centerline 42, which is identified as W/2. The length of the moment arm M1 can be mathematically determined by the control module 16 using the length of line H and the magnitude of angle π (which is Ω-Φ).

The thrust vectors T1, T2 each resolve into vector components in both the forward/reverse and left/right directions. The vector components, if equal in absolute magnitude to each other, may either cancel each other or be additive. If unequal in absolute magnitude, they may partially offset each other or be additive; however, a resultant force will exist in some linear direction. For purposes of explanation, FIG. 3 shows the vector components of the second thrust vector T2. As illustrated, second thrust vector T2 is oriented along dashed line 46, which is at steering angle θ with respect to the centerline 42. The second thrust vector T2 can be resolved into components, parallel and perpendicular to centerline 42, that are calculated as functions of the steering angle θ. For example, the second thrust vector T2 can be resolved into a reverse-directed force F2Y and a side-directed force F2X by multiplying the second thrust vector T2 by the cosine of θ and the sine of θ, respectively. The vector components of the first thrust T1 can also be resolved into forward/reverse and side directed components in a similar manner. Using these relationships, the vector components FX, FY of the net thrust produced by the propulsion system 12 can be calculated by adding the respective forward/reverse and left/right vector components of T1 and T2:

$$FX = T1(\sin(\theta)) + T2(\sin(\theta)) \quad (1)$$

$$FY = T1(\cos(\theta)) - T2(\cos(\theta)) \quad (2)$$

Note that in the example of FIGS. 3 and 4, T1 has positive vector components in both the X and Y directions, while T2 has a positive vector component in the X direction and a negative vector component in the Y direction, which is therefore subtracted from the Y-directed vector component of T1. The net thrust acting on the marine vessel 10 can be determined by vector addition of FX and FY.

Turning to FIG. 4, a moment (represented by arrow 50) can also be imposed on the marine vessel 10 to cause it to rotate about its center of gravity CG. The moment 50 can be imposed in either rotational direction: clockwise (CW) or counterclockwise (CCW). The rotating force resulting from the moment 50 can be applied either in combination with a linear force on the marine vessel 10 (such as when the vessel is outside of the predetermined range of the target location TL) or alone (such as when the vessel is within the predetermined range of the target location TL). In order to combine the moment 50 with a linear force, the first and second thrust vectors T1, T2 are aligned in generally opposite directions with their respective lines of action 44, 46 intersecting at the point 48 illustrated in FIG. 4. Although the construction lines are not shown in FIG. 4, effective moment arms M1, M2 exist with respect to the first and second thrust vectors T1, T2 and the center of gravity CG. Therefore, a moment is exerted on the marine vessel 10 as represented by arrow 50. If the thrust vectors T1, T2 are equal to each other in magnitude, are exerted along lines 44 and 46 respectively, and are symmetrical about the centerline 42 and in opposite directions, the net component forces parallel to the centerline 42 are equal to each other and therefore no net linear force is exerted on the marine vessel 10 in the forward/reverse direction. However, the first and second thrust vectors T1, T2 also resolve into forces perpendicular to the centerline 42, which in this example are additive. As a result, the marine vessel 10 in FIG. 4 will move to the right as it rotates in a clockwise direction in response to the moment 50.

If, on the other hand, it is desired that the moment 50 be the only force on the marine vessel 10, with no lateral movement in the forward/reverse or left/right directions, alternative first and second thrust vectors, represented by T1' and T2' in FIG. 4, are aligned parallel to each other along dashed lines 44' and 46', which are parallel to the centerline 42. The first and second thrust vectors T1', T2' are of equal magnitude and opposite direction. As a result, no net force is exerted on the marine vessel 10 in a forward/reverse direction. Because angle θ for both thrust vectors T1' and T2' is equal to 0 degrees, no resultant force is exerted on the marine vessel 10 in a direction perpendicular to the centerline 42. As a result, a rotation of the marine vessel 10 about its center of gravity CG is achieved with no linear movement in either the forward/reverse or the left/right directions.

With reference to FIGS. 3 and 4, it can be seen that virtually any type of movement, including translation and rotation, of the marine vessel 10 can be accomplished to achieve the target location TL and target heading TH. If forward translation with no rotation is needed, the propulsion devices 14a, 14b are oriented so that their thrust vectors align in a forward parallel orientation, and so long as the magnitude and direction of T1 are equal to that of T2, the marine vessel 10 will travel in a forward direction. If, on the other hand, a rotation about the center of gravity CG is requested, the first and second thrust vectors T1, T2 are directed along lines 44 and 46 that do not intersect at the center of gravity CG, but instead intersect at another point 48 along the centerline 42. As shown in FIGS. 3 and 4, this intersection point 48 can be forward from the center of gravity CG. The thrusts T1 and T2 shown in FIG. 4 result in a clockwise rotation (shown by moment 50) of the marine vessel 10. Alternatively, if the propulsion devices 14a, 14b were rotated so that their thrusts intersected at a point along the centerline 42 that was behind the center of gravity CG, an opposite effect could be realized, all else being equal. It should also be recognized that, with an intersection point 48 forward of the center of gravity CG, the directions of the first and second thrust vectors T1, T2 could be reversed to cause a rotation of the marine vessel 10 in a counterclockwise direction.

It should be noted that the steering angles of the propulsion devices 14a, 14b need not be the same. For example, the propulsion device 14a can be steered to angle θ1 with respect to the centerline 42, while the second propulsion device 14b can be steered to angle θ2. After the control module 16 has calculated a location difference and a heading difference based on comparison of the present and target locations and the present and target headings as described herein above with respect to FIG. 2, the control module 16 will determine the net thrust and the net moment desired of the propulsion system 12 based on a map stored in its memory that correlates a given desired linear and/or rotational movement with a total target linear thrust and a total target moment about a preselected point. It can be seen, therefore, that T1, T2, θ1, and θ2 can thereafter be calculated by the control module 16 using the geometric relationships described hereinabove according to the following equations:

$$FX = T1(\sin(\theta 1)) + T2(\sin(\theta 2)) \quad (1)$$

$$FY = T1(\cos(\theta 1)) - T2(\cos(\theta 2)) \quad (2)$$

$$MCW=(W/2)(T1(\cos(\theta1)))+(W/2)(T2(\cos(\theta2)))  \quad (3)$$

$$MCCW=L(T1(\sin(\theta1)))+L(T2(\sin(\theta2)))  \quad (4)$$

$$MT=MCW-MCCW  \quad (5)$$

where FX and FY are the vector components of the known target linear thrust, MT is the known total target moment (including clockwise moment MCW and counterclockwise moment MCCW) about the preselected point, and L and W/2 are also known as described above. The control module 16 then solves for the four unknowns (T1, T2, θ1, and θ2) using the four equations, thereby determining the steering angles, shift positions, and thrust magnitudes of each propulsion device 14a, 14b that will achieve the desired movement of the marine vessel 10. Note that equations 1-5 are particular to the thrust arrangements shown in FIGS. 3 and 4, and different vector components would contribute to clockwise or counterclockwise rotation and to forward/reverse or right/left translation given thrusts in different directions.

Figure 7:
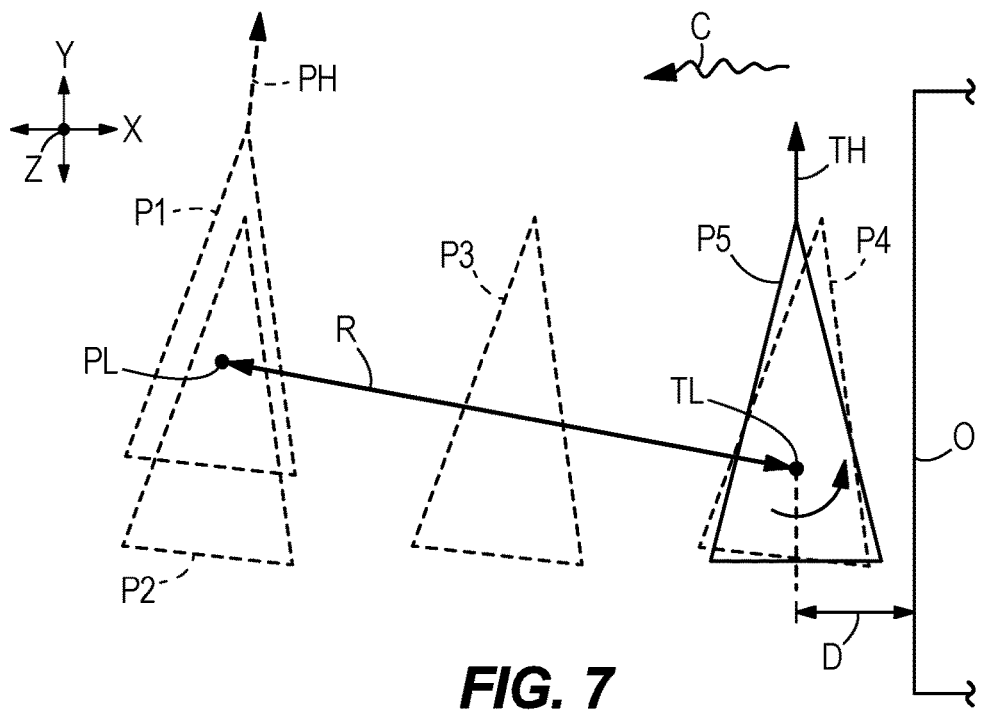
FIG. 7 illustrates a marine vessel moving according to the control algorithm of FIG. 5.
Figure 8:
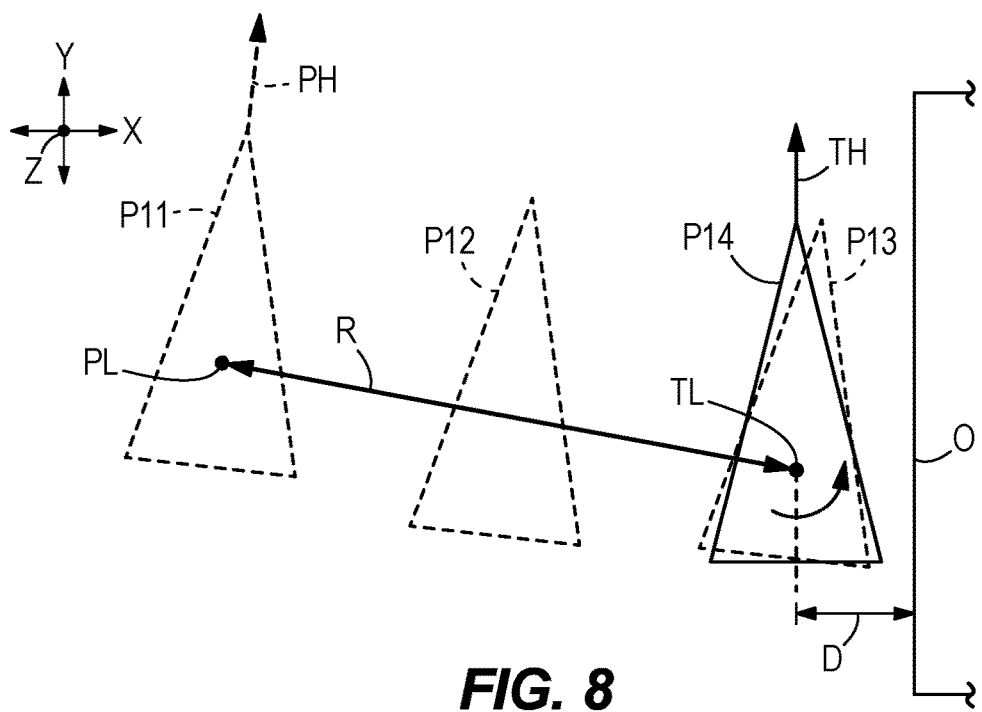
FIG. 8 illustrates a marine vessel moving according to the control algorithm of FIG. 6.

Referring to FIGS. 7 and 8, as noted briefly above, through research and development, the present inventors have discovered that it is helpful to control movement of the marine vessel 10 in no more than two, and in some cases one, degree of freedom once the marine vessel 10 comes within a predetermined range R of its target location TL proximate an object O, such as, but not limited to, a dock. Note that the predetermined range R is shown here as being greatly exaggerated for purposes of explanation. Note also that here the predetermined range R is shown as being defined by a measurement from the target location, TL, which in turn may be defined by the given distance D from the object O, as described with respect to FIG. 2. Thus, the predetermined range R could also be defined and stored as a measurement from the object O, where the total range for purposes of switching control authority is R+D. The control module 16 determines that the marine vessel 10 is within the predetermined range R of the target location TL based on information from any combination of the above-mentioned location sensors 34, including at least one of the GPS receiver 36 and the proximity and/or vision-based sensors 40a-40d. Once the control module 16 has determined that the marine vessel 10 is within the predetermined range R of the target location TL proximate the object O, the control module 16 causes the propulsion system 12 to move the marine vessel 10 along or about no more than two axes of control at a time until the marine vessel 10 arrives nearly exactly at the target location TL. The control module 16 may cause the audio output device 32 to emit a sound upon conclusion of this auto-docking procedure.

The predetermined range R may be calibrated and stored in the memory of the control module 16 for use by the present maneuvering algorithm. In other examples, the predetermined range R may depend on the speed of the marine vessel 10 and/or the mode in which the propulsion system 12 is operating, in which case the predetermined range R may be determined from a lookup table or similar input-output map. In other examples, the operator could input a desired predetermined range R via the touch screen 28 or other interactive display located at the command console 26, such as by selection or input of a numerical value, or by way of the operator selecting a GPS location nearby a dock or other landmark from a virtual map. Again, the predetermined range R can be input as a measurement from the object O or from the target location TL. In the former instance, the control module 16 may subtract out the given distance D from the input value of the predetermined range R for purposes of future comparisons with the present location PL of the marine vessel 10.

Thus, referring to FIGS. 1, 2, 7, and 8, the present disclosure is of a system for controlling a position of a marine vessel 10 near an object O. The marine vessel 10 is movable with respect to first, second, and third axes (e.g. the x, y, and z axes) that are perpendicular to one another and define six degrees of freedom of potential vessel movement. The system includes a location sensor 34 that measures a present location of the marine vessel 10. The location sensor 34 comprises at least one of a GPS receiver 36 and a proximity and/or vision based sensor 40a-40d. The system also includes a heading sensor that determines a present heading of the marine vessel 10, such as an IMU 38 or a compass. A control module 16 is in signal communication with the location sensor 34 and the heading sensor. A marine propulsion system 12 is in signal communication with the control module 16. The control module 16 determines marine vessel movements that are required to translate the marine vessel 10 from the present location PL to the target location TL and to rotate the marine vessel 10 from the present heading PH to the target heading TH. The control module 16 then controls the propulsion system 12 to produce components of the required marine vessel movements no more than two degrees of freedom at a time during a given iteration of control. In one example, the control module 16 controls the propulsion system 12 to produce components of the required marine vessel movements one degree of freedom at a time during a given iteration of control.

The system may also include a speed sensor, such as the GPS receiver 36 or other speed sensors noted herein above, that determines a speed of the marine vessel 10. A yaw rate sensor that determines an angular velocity of marine vessel 10, such as IMU 38, is also provided. One or more ambient condition sensors that measure ambient conditions surrounding the marine vessel may also be included on the marine vessel 10. The ambient condition sensors may include a current speed sensor 41 and/or a wind speed sensor 43, as shown in FIG. 1.

As noted herein above, the system may also include an engine powering the propulsion system, such as engines 18a, 18b provided for each propulsion device 14a, 14b. According to the present disclosure, the control module 16 may run the engines 18a, 18b at an idle speed while the propulsion system 12 produces the components of the required marine vessel movements no more than two degrees of freedom at a time, and in some examples only one degree of freedom at a time, during a given iteration of control. This allows the propulsion system 12 to effect only very minor movements of the marine vessel 10 as the control module 16 maneuvers the marine vessel 10 near the object O. In one example, the control module 16 runs the engines 18a, 18b above idle when the marine vessel 10 is outside of the predetermined range R from the target location TL. Once the marine vessel 10 reaches the predetermined range R from the target location TL, the engine speed of both engines 18a, 18b may be reduced to idle.

In one example, the control module 16 determines if the marine vessel 10 is within the predetermined range R of the target location TL based on the marine vessel's present location PL. The control module 16 controls the propulsion system 12 to produce the components of the required marine vessel movements no more than two degrees of freedom at a time, and in some instances only one degree of freedom at a time, during a given iteration of control only after determining that the marine vessel 10 is within the predetermined range R of the target location TL. This way, the marine vessel 10 is free to move according to an unhindered auto-docking control algorithm, as described herein above with respect to FIGS. 3 and 4, until the marine vessel 10 comes within the predetermined range R of the target location TL.

Figure 5:
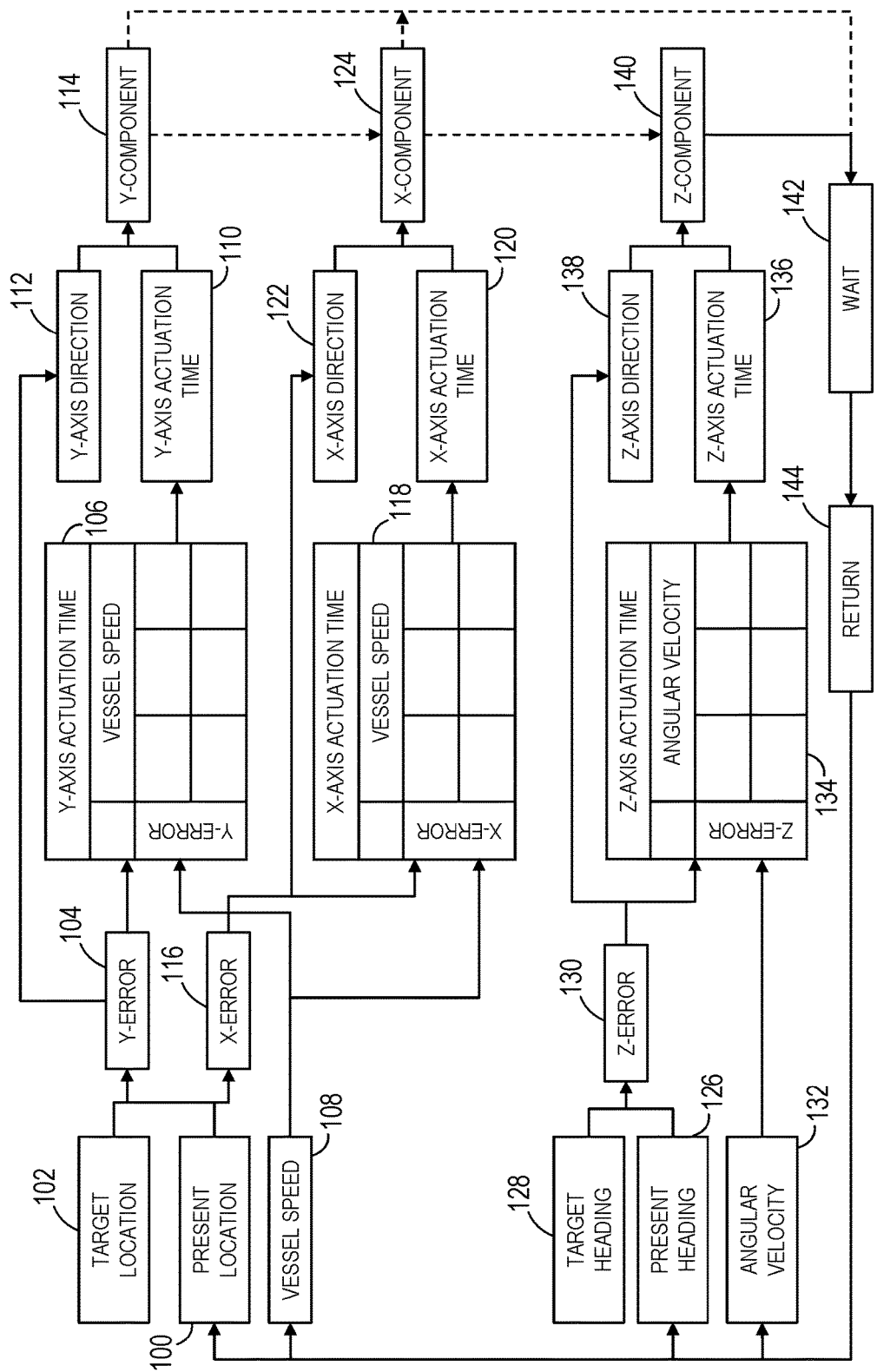
FIG. 5 illustrates one example of a control algorithm according to the present disclosure.

FIGS. 5 and 7 are used to describe the instance in which the propulsion system 12 produces components of the required marine vessel movements one degree of freedom at a time during a given iteration of control. Referring to FIG. 7, the marine vessel 10 begins at the position P1 shown in dashed lines with its present location shown at PL. The present location PL and target location TL are noted by the control module 16, as shown in FIG. 5 at 100 and 102, respectively. The control module 16 then determines a first error between the present location 100 and the target location 102 with respect to a first axis. In the example of FIG. 5, the control module 16 determines the y-error 104 with respect to the y-axis. Note that the first error could otherwise be computed with respect to the x-axis or the z-axis, and the y-axis is used here merely for exemplary purposes. The y-error computed at 104 is provided to an input-output map 106. The input-output map 106 outputs a y-axis actuation time 110 given the value of the y-error 104. In another example, the control module 16 may also determine a speed of the marine vessel 10, as shown at 108. The vessel speed 108 may also be provided to the input-output map 106, and the y-axis actuation time 110 determined based on this variable as well. In other words, the control module 16 determines a first actuation time (y-axis actuation time 110) for which to produce a first component of the required marine vessel movements along the first axis (y-axis) based on the first error (y-error 104). In one example, the control module determines the first actuation time based on the vessel speed 108 and the first error (y-error 104).

Meanwhile, the difference between the present location 100 and the target location 102, determined as the y-error at 104, is used to determine a y-axis direction of movement 112. The y-axis direction, as defined with respect to FIG. 2 herein above, is either forward or back with respect to the orientation of the vessel 10. The control module thereafter uses the y-axis direction 112 and the y-axis actuation time 110 to control the propulsion system 12 to produce the first component of the required marine vessel movements along the y-axis for the first actuation time, as shown at 114. To determine the angles of the propulsion devices 14a, 14b and their thrusts T1, T2, the control module 16 may set equations (1) and (3) to (5) provided above to zero and solve only for the component FY. With reference to FIG. 7, producing the first component (y-component 114) of the required marine vessel movements moves the marine vessel 10 from the position P1 to the position P2. Thus ends the first iteration of control.

During the next iteration of control, the control module 16 determines a second error between the present location 100 and the target location 102 with respect to a second axis. Here the second axis is the x-axis and the second error is output as the x-error, as shown at 116. Based on the second error, the control module 16 determines a second actuation time for which to produce a second component of the required marine vessel movements along the second axis. Similar to the determination of the y-axis actuation time, the x-axis actuation time may be determined by inputting the x-error 116 and the vessel speed 108 into an input-output table 118. Alternatively, the x-axis actuation time could be determined based solely on the x-error 116. The x-axis actuation time is thereafter output at 120. The x-axis direction 122 is determined based on the x-error 116, with respect to whether the marine vessel 10 is required to move left or right in order to reach the target location TL. The control module 16 then uses the x-axis direction 122 and the x-axis actuation time 120 to compute the x-component 124 of the required marine vessel movements. To determine the angles of the propulsion devices 14, 14b and their thrusts T1, T2, the control module 16 may set equations (2) to (5) provided above to zero and solve only for the component FX. Referring to FIG. 7, such x-component movement is shown by the marine vessel 10 moving from the position shown at P2 to an intermediate position P3 to another intermediate position P4, as shown in dashed lines. Note that the marine vessel 10 does not stop at position P3, but that position P3 is used only to show that the marine vessel 10 travels directly to the right with respect to the vessel framework from the position P2 to the position P4. Thus ends the second iteration of control.

With continuing reference to FIGS. 5 and 7, the control module 16 may also determine a present heading PH of the marine vessel 10, as shown at 126, and a target heading TH, as shown at 128. The control module 16 uses these inputs to determine a third error between the present heading 126 and the target heading 128 with respect to a third axis. Here, the third error is the z-error 130 and is determined with respect to the z-axis. Based on the third error, the control module 16 determines a third actuation time for which to produce a third component of the required marine vessel movements about the third axis. The third actuation time can be based only on the third error (z-error 130) or can also be based on a speed component. For example, the control module 16 may determine an angular velocity of the marine vessel, as shown at 132. The angular velocity 132 and the z-error 130 may be provided to an input-output map 134, and the control module 16 may determine the third actuation time based on the vessel's angular velocity 132 and the third error (z-error 130). The input-output map 134 returns the third actuation time (z-axis actuation time 136). The z-error 130 is used to compute the z-axis direction 138, which will be a yaw movement in either a clockwise or counterclockwise direction. The control module 16 uses the z-axis actuation time 136 and the z-axis direction 138 to compute the required marine vessel movements. This is the z-component, shown at 140. To determine the angles of the propulsion devices 14, 14b and their thrusts T1, T2, the control module 16 may set equations (1) and (2) and either (3) or (4) provided above to zero and solve only for the components MCW and MT or MCCW and MT, as appropriate. Such movement is shown in FIG. 7 by the vessel rotating from the position P4 to the position P5 shown in solid lines, which rotation was in a counterclockwise direction. Thus ends the third iteration of control.

Although the control module 16 may calculate the first, second, and third errors at the same time based on simultaneous comparisons of the present location 100 with the target location 102 and the present heading PH with the target heading TH, according to the example of FIGS. 5 and 7, the control module 16 only effects movement of the marine vessel 10 with respect to one degree of freedom at a time. In one example, in response to expiration of the first actuation time (y-axis actuation time 110) the control module 16 controls the propulsion system 12 to produce the second component (x-component 124) of the marine vessel movements for the second actuation time (x-axis actuation time 120). This is shown by the dashed line arrow leading from 114 to 124. In response to expiration of the second actuation time, the control module 16 controls the propulsion system 12 to produce the third component of the required marine vessel movements for the third actuation time. This is shown by the dashed line arrow leading from 124 to 140. Alternatively, the control module 16 might move the marine vessel 10 along the first axis during one iteration of control, then re-measure the present location 100 of the marine vessel 10 before determining the second error, and then re-measure the present heading 126 before determining the third error. Such options are shown by the dashed lines leading from 114 and 124 to "wait" at 142 and then "return" at 144.

Note that the y, x, and z-components of the required marine vessel movements need not be produced in the order shown. For instance, the marine vessel 10 could first be translated along the x-axis and then along the y-axis (see FIG. 2, vectors CL and CR) and then rotated about the z-axis. In another example, the marine vessel 10 could first be rotated and then translated along the x- and then y- or the y- and then x-axes. In some examples, the control module 16 may choose to correct heading error first, if the heading error is very large and rotating the marine vessel 10 so near the object O might cause the marine vessel 10 to hit the object. In other examples, the control module 16 may choose to eliminate the y-axis error first, in relatively open water, assuming that it is undesirable to translate the marine vessel 10 in the y-direction when it is directly next to the object O.

As noted above, the control module 16 runs the engines 18a, 18b powering the propulsion system 12 at an idle speed while producing the components of the required marine vessel movements one degree of freedom at a time, such that each of the movements from position P1 to P2 to P3 to P4 to P5 are in fact relatively small movements, but are shown exaggerated here for purposes of illustration. However, if ambient conditions, such as current or wind, surrounding the marine vessel 10 are very strong, operating the engines 18a, 18b at idle speed may not produce enough thrust to move the marine vessel 10 at all. For example, if a strong current C was flowing away from the object O FIG. 7, but the engines were only operated in idle, it may be nearly impossible to move the marine vessel 10 toward the object O against the current C without providing additional thrust. For this reason, the control module 16 may measure ambient conditions surrounding the marine vessel 10 and may run the engines 18a, 18b above the idle speed in response to determining that the ambient conditions are acting in directions that would tend to counteract the required marine vessel movements. The engine speeds could, for example, be multiplied by a multiplier that is determined from an input-output map that accepts wind speed, current speed, or another ambient condition as an input. Other examples include increasing the engine speed to a predetermined non-idle speed or using an adder determined from an input-output map.

Returning to FIG. 5, after the exemplary three iterations of control have been completed, the control module 16 may allow a wait time to pass after producing the third component of the required marine vessel movements (the z-component 140) for the third actuation time. This is shown at 142 in FIG. 5. The wait time may be calibrated, or may vary with the length of the actuation times. In response to expiration of the wait time, the method may return to start, as shown at 144, and may thereafter include measuring an updated present location of the marine vessel, as shown at 100, determining an updated present heading of the marine vessel, as shown at 126, and determining updated marine vessel movements that are required to translate the marine vessel 10 from the updated present location to the target location and to rotate the marine vessel 10 from the updated present heading to the target heading. The control module 16 may thereafter automatically control the propulsion system 12 to produce components of the updated required marine vessel movements one degree of freedom at a time during a give iteration of control. Such a second round of error correction will account for any adjustments that need to be made due to the marine vessel 10 not having moved to the desired positions or rotated to the desired heading during the first three iterations of control. However, instituting a wait time, as shown at 142, prior to undertaking such second round of control will allow the system to stabilize, and will allow any marine vessel movement due to momentum to die down before further measurements are made. Note that in the example where the present location 100 and/or present heading 126 are re-measured between iterations of control, such re-measurement can be done immediately after expiration of the first and second actuation times, respectively, or after additionally waiting for the wait time to expire.

Figure 6:
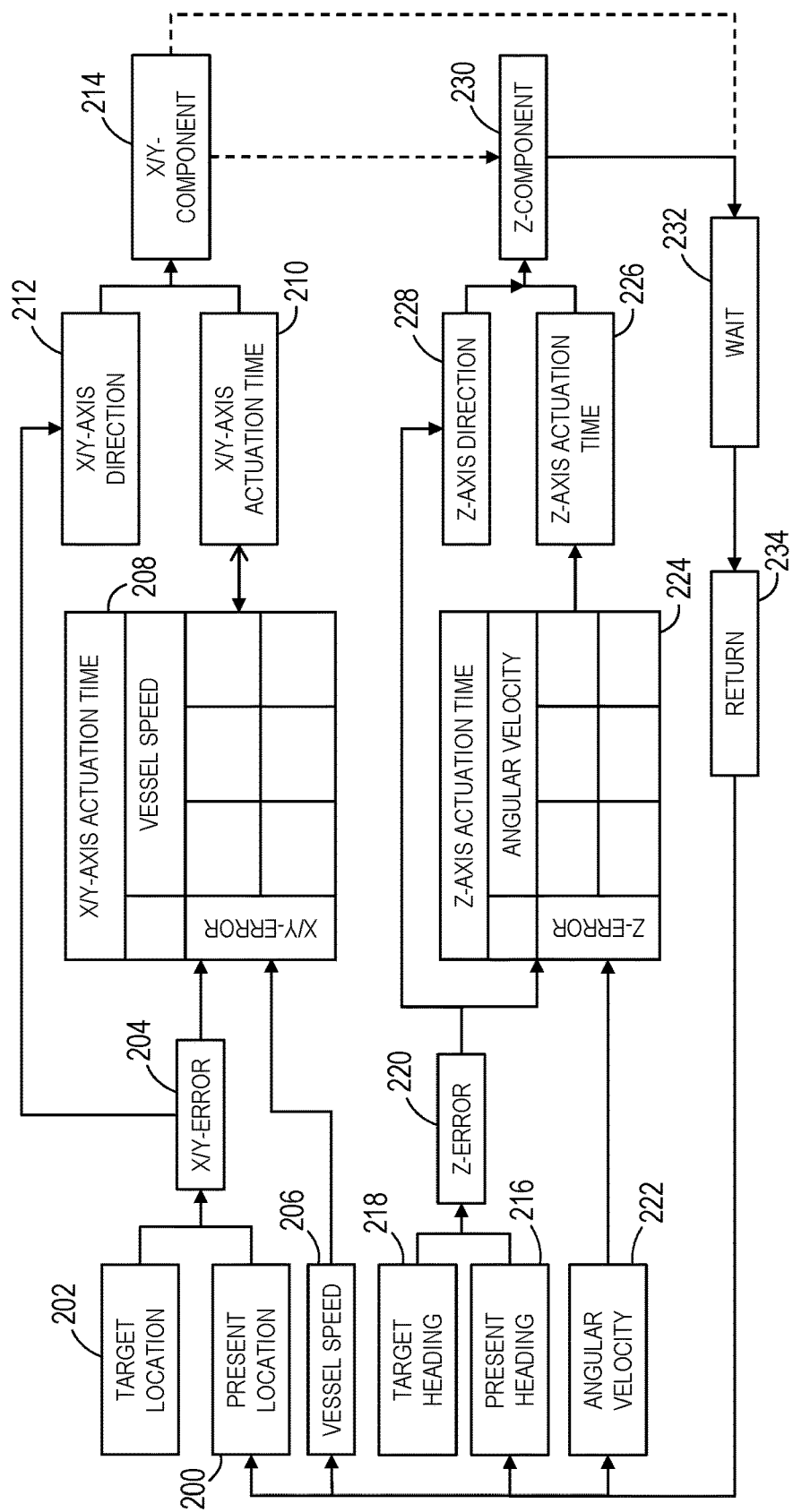
FIG. 6 illustrates another example of a control algorithm according to the present disclosure.

FIGS. 6 and 8 will now be used to describe a method in which the control module 16 controls the propulsion system 12 to produce components of the required marine vessel movements no more than two degrees of freedom at a time during a given iteration of control. Similar to the method described above with respect to FIGS. 5 and 7, the control module 16 may determine if the marine vessel 10 is within a predetermined range R of the target location TL based on the marine vessel's present location PL, and may control the propulsion system 12 to produce the components of the required marine vessel movements no more than two degrees of freedom at a time during a given iteration of control only after determining that the marine vessel 10 is within the predetermined range R of the target location.

With respect to FIG. 6, the control module 16 determines an error between the present location PL, as shown at 200, and the target location TL, as shown at 202. The control module 16 also determines a vessel speed, as shown at 206. In contrast to the method of FIG. 5, in the method of FIG. 6, the control module 16 determines an error between the present location 200 and the target location 202 with respect to at least one (here, two) of the first, second, and third axes. Here, the control module 16 determines the error with respect both the x- and y-axes, as shown at 204. The control module 16 then determines an actuation time for which to produce a given component of the required marine vessel movements along the at least one of the first, second, and third axes (here, the x- and y-axes) based on the error (x/y-error 204). The actuation time could be based on the error alone, or the control module 16 may determine the actuation time based on the error and the speed of the marine vessel, input at 206. For example, using the input-output map 208, the control module 16 may determine an x/y-axis actuation time, as shown at 210. The control module 16 may use the x/y-error determined at 204 to determine an x/y-axis direction of movement for the marine vessel 10, as shown at 212. For example, this movement may be along the line COG as shown in FIG. 2 rather than separately along the line CL and then the line CR. The control module 16 then controls the propulsion system 12 to produce the given component of the required marine vessel movements for the actuation time. Here, the given component is the x/y-component, as shown at 214. To determine the angles of the propulsion devices 14, 14b and their thrusts T1, T2, the control module 16 may set equations (3) to (5) provided above to zero and solve only for the components FX and FY. Thus ends the first iteration of control.

As shown in FIG. 6, the control module 16 determines the present heading PH, as shown at 216, and the target heading TH, as shown at 218, and uses these values to compute a third error (z-error 220). The control module 16 then determines the actuation time for rotation about the third axis based on the z-error 220 and the angular velocity of the marine vessel, which is determined at 222. For example, the control module 16 uses an input-output map 224 to determine a z-axis actuation time 226. The third error, here the z-error, is also used to determine a z-axis direction of rotation, as shown at 228. The control module 16 then produces the third component of the required marine vessel movements, here the z-component, as shown at 230. As described with respect to FIG. 5, the control module 16 may then wait, as shown at 232, and subsequently return, as shown at 234.

In the present example, the first and second axes are the horizontal axes and the third axis is a vertical axis, and the control module 16 controlled the propulsion system 12 to produce a lateral component of the required marine vessel movements along the first and second axes during a different iteration of control than a rotational component of the required marine vessel movements about the third axis. However, the order of control may instead be switched, such that rotation about the third axis occurs before translation with respect to the first and second axes. Additionally, as noted with respect to FIG. 5, the method of FIG. 6 could include producing the z-component 230 after waiting for the x/y-axis actuation time 210 to expire, as shown by the dashed line arrow leading directly from 214 to 230, or could include returning with or without waiting between control iterations and re-measuring the present location 200 and the present heading 216 before carrying out the next iteration of control.

Turning to FIG. 8, the corresponding movements of the marine vessel 10 are shown. The marine vessel starts at the present location PL. When the control module 16 determines that the present location PL of the marine vessel 10 is within the predetermined range R of the target location TL, the control algorithm begins. During the first iteration of control, the control module 16 computes and carries out the x-y-component 214 of the required marine vessel movements, as described with respect to FIG. 6. Thus, the marine vessel 10 moves from the position P11 to the intermediate position P12 to the position P13. Again, similar to description of FIG. 7, P12 is not a position at which the marine vessel 10 stops, but is rather used to show that that marine vessel 10 moves with respect to both the x- and y-axes at the same time while translating from position P11 to position P13. During the second iteration of control, the control module 16 carries out the z-component 230 of the required marine vessel movements, as described with respect to FIG. 6. The marine vessel 10 rotates in the counterclockwise direction from the position P13 to the position P14 shown in solid lines. The marine vessel 10 is now at the target heading TH.

Similar to the method described with respect to FIG. 5, according to the method of FIG. 6, the control module 16 may allow a wait time 232 to pass after producing all components of the required marine vessel movements no more than two degrees of freedom at a time during a given iteration of control. Subsequently, the control module 16 may receive an updated present location of the marine vessel 10 from the location sensor (such as GPS receiver 36 or sensors 40a-40d) and an updated present heading from the heading sensor (such as IMU 38). The control module 16 may then determine updated marine vessel movements that are required to translate the marine vessel 10 from the updated present location to the target location and to rotate the marine vessel 10 from the updated present heading to the target heading. The control module 16 will control the propulsion system 12 to produce components of the updated required marine vessel movements no more than two degrees of freedom at a time during a given iteration of control.

Thus, as FIGS. 7 and 8 show, the control algorithms described in FIGS. 5 and 6 bring about the same end result, wherein the marine vessel movements determined by the control module 16 both translate the marine vessel 10 from the present location PL to the target location TL and also rotate the marine vessel from the present heading PH to the target heading TH. However, in the method of FIG. 7, the marine vessel 10 is only allowed to move with respect to one degree of freedom per a given iteration of control, while in the method of FIG. 8, the marine vessel 10 can move with respect to two degrees of freedom at once during a given iteration of control.

Figure 9:
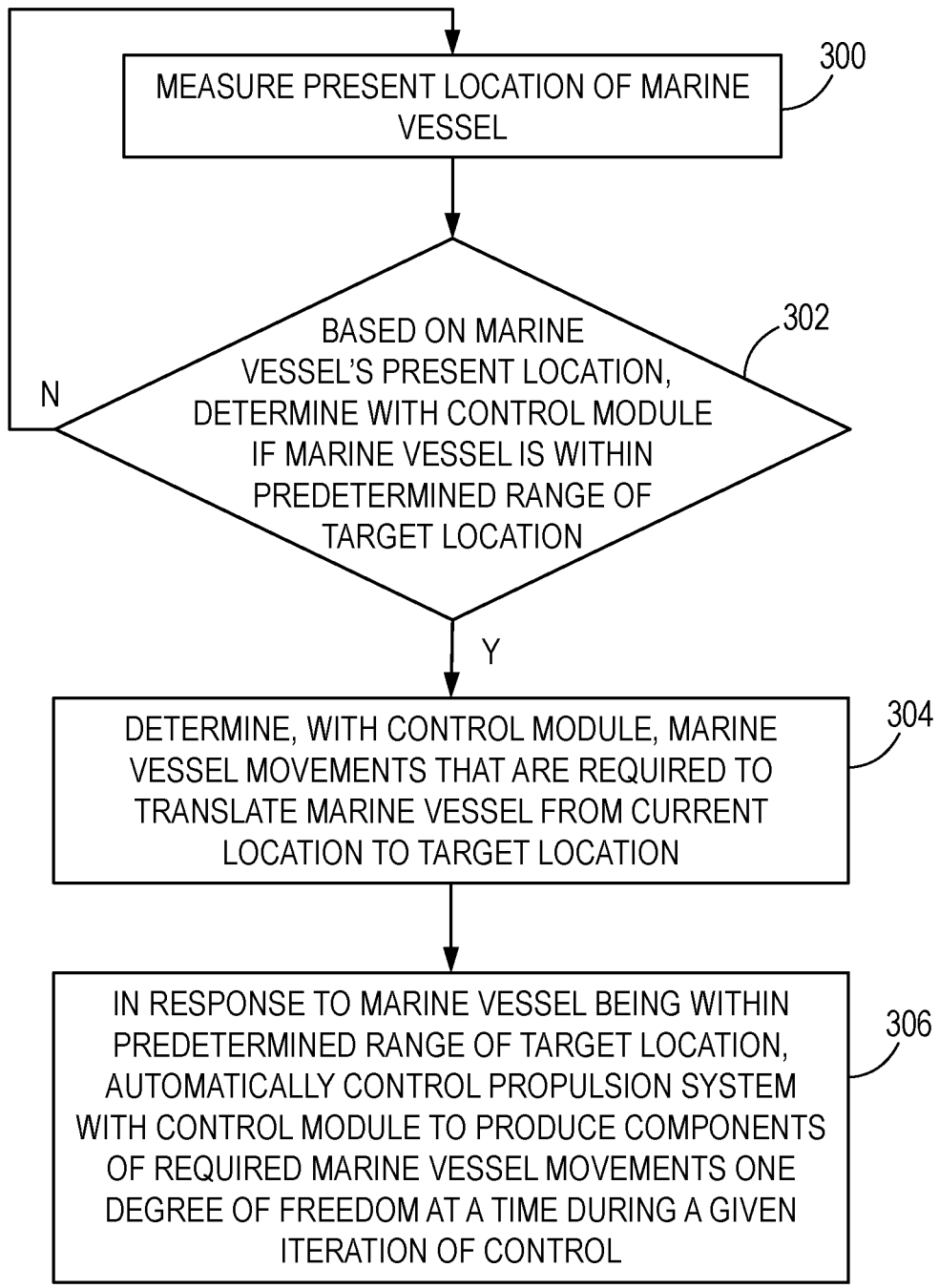
FIG. 9 illustrates another method according to the present disclosure.

A method according to the present disclosure will now be described with respect to FIG. 9. As shown at 300, the method includes measuring a present location of the marine vessel 10. As shown at 302, the method includes determining with a control module 16 if the marine vessel 10 is within a predetermined range of a target location based on the marine vessel's present location. As shown at 304, the method includes determining, with the control module 16, marine vessel movements that are required to translate the marine vessel 10 from the present location to the target location. As shown at 306, in response to the marine vessel 10 being within the predetermined range R of the target location (determination at 302 is YES) the method includes automatically controlling the propulsion system 12 with the control module 16 to produce components of the required marine vessel movements one degree of freedom at a time during a given iteration of control. On the other hand, if the determination at box 302 is NO, the method returns to measuring the present location of the marine vessel, as shown at 300.

The present system and method aid in the auto-docking algorithm by reducing the likelihood that when the marine vessel 10 gets too close to the target location TL it will oscillate between positions near, but not on, the target location due to the vessel having approached the setpoint too quickly or due the inaccuracy of the GPS receiver 36 at slow speeds. During auto-docking, it is undesirable to have such oscillation, as this will cause the vessel to hit the dock. By using a timed shift event and monitoring/re-measuring process, the present algorithm slows the docking movements and prevents such oscillation. Moving the marine vessel 10 with respect to only one or two degrees of freedom at a time ensures that the propulsion system 12 is able to precisely carry out the movement requested of it. Interaction between wash off the propellers, which might otherwise result in the marine vessel 10 moving in a direction that was not commanded, will be less likely to hinder the requested movement. At least translational and rotational movements are split into different control iterations, thus allowing the full effect of the thrusts to be used to carry out the commanded movement.

As described above, the audio output device 32, which is in signal communication with the control module 16, may emit a sound in response to a command from the control module 16. For example, the control module 16 may cause the audio output device 32 to emit a sound in response to the marine vessel 10 reaching the target location TL. The sound, which can be a buzz, a voice alert, a bell, a beep, or any other audio output, signals to the operator of the marine vessel 10 that the auto-docking sequence is finished. The sound informs the operator that it is safe to hop off the marine vessel 10 and onto the dock. In other examples, emission of sound from the audio output device 32 is accompanied by illumination of a light at the command console 26 and/or an alert that appears on the touch screen 28 to indicate that the auto-docking procedure is complete. In still other examples, no sound is provided, and only a visual indication signifies that the auto-docking procedure has ended.

The different systems and methods described herein may be used alone or in combination with other systems and methods. Various equivalents, alternatives, and modifications are possible within the scope of the appended claims. Each limitation in the appended claims is intended to invoke interpretation under 35 USC § 112(f), only if the terms "means for" or "step for" are explicitly recited in the respective limitation.

What is claimed is:

1. A method for controlling a position of a marine vessel, the marine vessel being powered by a marine propulsion system and movable with respect to first, second, and third axes that are perpendicular to one another and define six degrees of freedom of potential vessel movement, the method comprising:
   measuring a present location of the marine vessel;
   determining a present heading of the marine vessel;
   based on the marine vessel's present location, determining with a controller that the marine vessel is less than or equal to a predetermined range from a target location;
   determining, with the controller, marine vessel movements that are required to translate the marine vessel from the present location to the target location and to rotate the marine vessel from the present heading to a target heading; and
   in response to the marine vessel being less than or equal to the predetermined range from the target location, automatically controlling the marine propulsion system with the controller to produce components of the required marine vessel movements one degree of freedom at a time during a given iteration of control;
   allowing a wait time to pass after producing all components of the required marine vessel movements one degree of freedom at a time during a given iteration of control; and
   in response to expiration of the wait time:
      measuring an updated present location of the marine vessel;
      determining an updated present heading of the marine vessel;
      determining, with the controller, updated marine vessel movements that are required to translate the marine vessel from the updated present location to the target location and to rotate the marine vessel from the updated present heading to the target heading; and
      automatically controlling the marine propulsion system with the controller to produce components of the updated required marine vessel movements one degree of freedom at a time during a given iteration of control.

2. The method of claim 1, further comprising:
   determining a first error between the present location and the target location with respect to the first axis;
   based on the first error, determining a first actuation time for which to produce a first component of the required marine vessel movements along the first axis; and
   controlling the marine propulsion system to produce the first component of the required marine vessel movements for the first actuation time.

3. The method of claim 2, further comprising:
   determining a speed of the marine vessel; and
   determining the first actuation time based on the vessel speed and the first error.

4. The method of claim 2, further comprising:
   determining a second error between the present location and the target location with respect to the second axis;
   based on the second error, determining a second actuation time for which to produce a second component of the required marine vessel movements along the second axis;
   in response to expiration of the first actuation time, controlling the marine propulsion system to produce the second component of the required marine vessel movements for the second actuation time.

5. The method of claim 4, further comprising:
   determining a third error between the present heading and the target heading with respect to the third axis;
   based on the third error, determining a third actuation time for which to produce a third component of the required marine vessel movements about the third axis; and
   in response to expiration of the second actuation time, controlling the marine propulsion system to produce the third component of the required marine vessel movements for the third actuation time.

6. The method of claim 5, further comprising:
   determining an angular velocity of the marine vessel; and
   determining the third actuation time based on the vessel's angular velocity and the third error.

7. The method of claim 1, further comprising running an engine powering the marine propulsion system at an idle speed while producing the components of the required marine vessel movements one degree of freedom at a time.

8. The method of claim 7, further comprising:
   measuring ambient conditions surrounding the marine vessel; and
   running the engine above the idle speed in response to determining with the controller that the ambient conditions are acting in directions that counteract the required marine vessel movements.

9. A system for controlling a position of a marine vessel, the marine vessel being movable with respect to first, second, and third axes that are perpendicular to one another and define six degrees of freedom of potential vessel movement, the system comprising:
   a location sensor that measures a present location of the marine vessel;
   a heading sensor that determines a present heading of the marine vessel;
   a controller in signal communication with the location sensor and the heading sensor; and
   a marine propulsion system in signal communication with the controller;
   wherein the controller determines marine vessel movements that are required to translate the marine vessel from the present location to a target location and to rotate the marine vessel from the present heading to a target heading;
   wherein the controller controls the marine propulsion system to produce components of the required marine vessel movements no more than two degrees of freedom at a time during a given iteration of control;

wherein the controller determines that the marine vessel is less than or equal to a predetermined range from the target location based on the marine vessel's present location;

wherein the controller controls the marine propulsion system to produce the components of the required marine vessel movements no more than two degrees of freedom at a time during a given iteration of control only after determining that the marine vessel is less than or equal to the predetermined range from the target location;

wherein the controller allows a wait time to pass after producing all components of the required marine vessel movements no more than two degrees of freedom at a time during a given iteration of control, and wherein subsequently:

the controller receives an updated present location of the marine vessel from the location sensor and an updated present heading from the heading sensor;

the controller determines updated marine vessel movements that are required to translate the marine vessel from the updated present location to the target location and to rotate the marine vessel from the updated present heading to the target heading; and the controller controls the marine propulsion system to produce components of the updated required marine vessel movements no more than two degrees of freedom at a time during a given iteration of control.

10. The system of claim 9, wherein the controller:

determines an error between the present location and the target location with respect to at least one of the first, second, and third axes;

determines an actuation time for which to produce a given component of the required marine vessel movements along the at least one of the first, second, and third axes based on the error; and controls the marine propulsion system to produce the given component of the required marine vessel movements for the actuation time.

11. The system of claim 10, wherein the first and second axes are fore/aft and left/right axes, respectively, and the third axis is a yaw axis, and wherein the controller controls the marine propulsion system to produce a translational component of the required marine vessel movements along the first and second axes during a different iteration of control than a rotational component of the required marine vessel movements about the third axis.

12. The system of claim 10, further comprising:

a speed sensor that determines a speed of the marine vessel; and a yaw rate sensor that determines an angular velocity of the marine vessel;

wherein the controller determines the actuation time based on the error and one of the speed and the angular velocity of the marine vessel.

13. The system of claim 9, further comprising an engine powering the marine propulsion system, wherein the controller runs the engine at an idle speed while the marine propulsion system produces the components of the required marine vessel movements no more than two degrees of freedom at a time during a given iteration of control.

14. The system of claim 13, further comprising one or more ambient condition sensors measuring ambient conditions surrounding the marine vessel, wherein the controller runs the engine above the idle speed in response to determining that the ambient conditions are acting in directions that counteract the required marine vessel movements.

15. The system of claim 9, wherein the controller controls the marine propulsion system to produce the components of the required marine vessel movements one degree of freedom at a time during a given iteration of control.

16. The system of claim 9, wherein the location sensor comprises at least one of a global positioning system (GPS) receiver, a proximity sensor, and a vision-based sensor.

* * * * *